US009629216B2

(12) United States Patent
Jiang et al.

(10) Patent No.: US 9,629,216 B2
(45) Date of Patent: Apr. 18, 2017

(54) LED TUBE LAMP

(71) Applicant: JIAXING SUPER LIGHTING ELECTRIC APPLIANCE CO., LTD, Jiaxing (CN)

(72) Inventors: Tao Jiang, Jiaxing (CN); Aiming Xiong, Jiaxing (CN); Hechen Hu, Jiaxing (CN); Qifeng Ye, Jiaxing (CN); Hong Xu, Jiaxing (CN)

(73) Assignee: Jiaxing Super Lighting Electric Appliance Co., Ltd., Jiaxing, Zhejiang (CN)

( * ) Notice: Subject to any disclaimer, the term of this patent is extended or adjusted under 35 U.S.C. 154(b) by 0 days.

(21) Appl. No.: 15/065,895

(22) Filed: Mar. 10, 2016

(65) Prior Publication Data

US 2016/0255694 A1    Sep. 1, 2016

Related U.S. Application Data

(63) Continuation of application No. 14/865,387, filed on Sep. 25, 2015, now Pat. No. 9,609,711.

(30) Foreign Application Priority Data

Sep. 28, 2014 (CN) .......................... 2014 1 0507660
Sep. 28, 2014 (CN) .......................... 2014 1 0508899
(Continued)

(51) Int. Cl.
H05B 37/00 (2006.01)
H05B 41/00 (2006.01)
(Continued)

(52) U.S. Cl.
CPC ....... H05B 33/0845 (2013.01); F21K 9/1375 (2013.01); F21K 9/27 (2016.08);
(Continued)

(58) Field of Classification Search
None
See application file for complete search history.

(56) References Cited

U.S. PATENT DOCUMENTS 5,575,459 A    11/1996 Anderson
5,921,660 A    7/1999 Yu
(Continued)

FOREIGN PATENT DOCUMENTS

CN    200965185 Y    10/2007
CN    101715265 A    5/2010
(Continued)

OTHER PUBLICATIONS

PCT Search Report for International Application No. PCT/CN2015/090859 dated Jan. 4, 2016.
(Continued)

Primary Examiner — Anh Tran
(74) Attorney, Agent, or Firm — Muir Patent Law, PLLC

(57) ABSTRACT

The disclosure provides an LED tube lamp, comprising a tube, a terminal adapter circuit, a first rectifying circuit, a filtering circuit, an LED lighting module and an anti-flickering circuit. The tube has a first pin and a second pin for receiving an external driving signal. The terminal adapter circuit has two fuses respectively coupled to the first and second pins. The first rectifying circuit is coupled to the first and second pins for rectifying the external driving signal to generate a rectified signal. The filtering circuit is coupled to the first rectifying circuit for filtering the rectified signal to generate a filtered signal. The LED lighting module is coupled to the filtering circuit and the LED lighting module having a LED module, wherein the LED lighting module is configured to receive the filtered signal and generate a driving signal, and the LED module receives the driving signal and lights. The anti-flickering circuit is coupled between the filtering circuit and the LED lighting module,
(Continued)

and is configured such that a current higher than a particular anti-flickering current flows through the anti-flickering circuit when a peak value of the filtered signal is higher than a minimum conduction voltage of the LED module.

30 Claims, 21 Drawing Sheets

(30) Foreign Application Priority Data

| Nov. 6, 2014 | (CN) | 2014 1 0623355 |
|---|---|---|
| Dec. 5, 2014 | (CN) | 2014 1 0734425 |
| Feb. 12, 2015 | (CN) | 2015 1 0075925 |
| Mar. 11, 2015 | (CN) | 2015 1 0104823 |
| Mar. 25, 2015 | (CN) | 2015 1 0133689 |
| Mar. 26, 2015 | (CN) | 2015 1 0134586 |
| Mar. 27, 2015 | (CN) | 2015 1 0136796 |
| Apr. 3, 2015 | (CN) | 2015 1 0155807 |
| Apr. 15, 2015 | (CN) | 2015 1 0173861 |
| Apr. 22, 2015 | (CN) | 2015 1 0193980 |
| May 19, 2015 | (CN) | 2015 1 0259151 |
| May 22, 2015 | (CN) | 2015 1 0268927 |
| May 29, 2015 | (CN) | 2015 1 0284720 |
| Jun. 10, 2015 | (CN) | 2015 1 0315636 |
| Jun. 12, 2015 | (CN) | 2015 1 0324394 |
| Jun. 17, 2015 | (CN) | 2015 1 0338027 |
| Jun. 26, 2015 | (CN) | 2015 1 0364735 |
| Jun. 26, 2015 | (CN) | 2015 1 0372375 |
| Jun. 26, 2015 | (CN) | 2015 1 0373492 |
| Jun. 29, 2015 | (CN) | 2015 1 0378322 |
| Jul. 2, 2015 | (CN) | 2015 1 0391910 |
| Jul. 10, 2015 | (CN) | 2015 1 0406595 |
| Jul. 20, 2015 | (CN) | 2015 1 0428680 |
| Jul. 27, 2015 | (CN) | 2015 1 0448220 |
| Aug. 7, 2015 | (CN) | 2015 1 0482944 |
| Aug. 8, 2015 | (CN) | 2015 1 0483475 |
| Aug. 8, 2015 | (CN) | 2015 1 0486115 |
| Aug. 14, 2015 | (CN) | 2015 1 0499512 |
| Sep. 2, 2015 | (CN) | 2015 1 0555543 |
| Sep. 6, 2015 | (CN) | 2015 1 0557717 |
| Sep. 18, 2015 | (CN) | 2015 1 0595173 |
| Oct. 8, 2015 | (CN) | 2015 1 0645134 |
| Oct. 29, 2015 | (CN) | 2015 1 0716899 |

(51) Int. Cl.

| H05B 33/08 | (2006.01) |
|---|---|
| F21V 23/00 | (2015.01) |
| F21K 9/27 | (2016.01) |
| F21K 99/00 | (2016.01) |
| F21V 3/04 | (2006.01) |
| F21V 7/22 | (2006.01) |
| F21V 15/015 | (2006.01) |
| F21V 17/10 | (2006.01) |
| F21V 23/02 | (2006.01) |
| F21V 29/83 | (2015.01) |
| F21Y 103/00 | (2016.01) |
| F21Y 101/00 | (2016.01) |
| F21Y 101/02 | (2006.01) |

(52) U.S. Cl.
CPC .......... *F21V 3/0418* (2013.01); *F21V 3/0472* (2013.01); *F21V 7/22* (2013.01); *F21V 15/015* (2013.01); *F21V 17/101* (2013.01); *F21V 23/009* (2013.01); *F21V 23/02* (2013.01); *H05B 33/0803* (2013.01); *H05B 33/0809* (2013.01); *H05B 33/0815* (2013.01); *H05B 33/0884* (2013.01); *F21V 29/83* (2015.01); *F21Y 2101/00* (2013.01); *F21Y 2101/02* (2013.01); *F21Y 2103/003* (2013.01)

(56) References Cited

U.S. PATENT DOCUMENTS

| 6,127,783 | A | 10/2000 | Pashley |
|---|---|---|---|
| 6,609,813 | B1 | 8/2003 | Showers |
| 6,796,680 | B1 | 9/2004 | Showers |
| 7,033,239 | B2 | 4/2006 | Cunkelman |
| 7,380,961 | B2 | 6/2008 | Moriyama |
| 8,360,599 | B2 | 1/2013 | Ivey et al. |
| 8,525,427 | B2 | 9/2013 | Samoilenko et al. |
| 8,579,463 | B2 | 11/2013 | Clough |
| 8,648,542 | B2 | 2/2014 | Kim et al. |
| 8,749,167 | B2 | 6/2014 | Hsia et al. |
| 9,210,744 | B2 | 12/2015 | Del Carmen, Jr. et al. |
| D761,216 | S | 7/2016 | Jiang |
| 9,447,929 | B2 | 9/2016 | Jiang |
| D768,891 | S | 10/2016 | Jiang et al. |
| 2002/0044456 | A1 | 4/2002 | Balestriero |
| 2002/0176262 | A1 | 11/2002 | Tripathi |
| 2003/0102819 | A1 | 6/2003 | Min |
| 2003/0231485 | A1 | 12/2003 | Chien |
| 2004/0095078 | A1 | 5/2004 | Leong |
| 2004/0189218 | A1 | 9/2004 | Leong |
| 2005/0128751 | A1 | 6/2005 | Roberge |
| 2005/0162850 | A1 | 7/2005 | Luk |
| 2005/0207166 | A1 | 9/2005 | Kan |
| 2005/0213321 | A1 | 9/2005 | Lin |
| 2007/0001709 | A1 | 1/2007 | Shen |
| 2007/0145915 | A1 | 6/2007 | Roberge |
| 2007/0210687 | A1 | 9/2007 | Axelsson |
| 2007/0274084 | A1 | 11/2007 | Kan |
| 2008/0030981 | A1 | 2/2008 | Mrakovich |
| 2008/0192476 | A1 | 8/2008 | Hiratsuka |
| 2008/0278941 | A1 | 11/2008 | Logan |
| 2009/0161359 | A1 | 6/2009 | Siemiet |
| 2010/0096976 | A1 | 4/2010 | Park |
| 2010/0102729 | A1 | 4/2010 | Katzir |
| 2010/0181925 | A1 | 7/2010 | Ivey et al. |
| 2010/0220469 | A1* | 9/2010 | Ivey .......... F21K 9/27 362/218 |
| 2010/0253226 | A1 | 10/2010 | Oki |
| 2011/0038146 | A1 | 2/2011 | Chen |
| 2011/0057572 | A1 | 3/2011 | Kit et al. |
| 2011/0090684 | A1 | 4/2011 | Logan |
| 2011/0121756 | A1 | 5/2011 | Thomas et al. |
| 2011/0148313 | A1 | 6/2011 | Ramaker |
| 2011/0149563 | A1 | 6/2011 | Hsia et al. |
| 2011/0176297 | A1* | 7/2011 | Hsia .......... F21V 25/04 362/217.1 |
| 2011/0181190 | A1 | 7/2011 | Lin et al. |
| 2011/0216538 | A1 | 9/2011 | Logan |
| 2011/0260614 | A1 | 10/2011 | Hartikka et al. |
| 2012/0069556 | A1 | 3/2012 | Bertram |
| 2012/0106157 | A1 | 5/2012 | Simon |
| 2012/0153873 | A1 | 6/2012 | Hayashi |
| 2012/0169968 | A1 | 7/2012 | Ishimori et al. |
| 2012/0181952 | A1 | 7/2012 | Roeer |
| 2012/0235578 | A1 | 9/2012 | Miller |
| 2012/0299501 | A1 | 11/2012 | Kost et al. |
| 2012/0300445 | A1* | 11/2012 | Chu .......... F21V 25/04 362/217.13 |
| 2012/0313540 | A1 | 12/2012 | Lin |
| 2013/0050998 | A1 | 2/2013 | Chu et al. |
| 2013/0170245 | A1 | 7/2013 | Hong |
| 2013/0182425 | A1 | 7/2013 | Seki |
| 2013/0200797 | A1 | 8/2013 | Timmermans |
| 2013/0320869 | A1 | 12/2013 | Jans |
| 2014/0035463 | A1 | 2/2014 | Miyamichi |
| 2014/0055029 | A1 | 2/2014 | Jans |
| 2014/0071667 | A1 | 3/2014 | Hayashi |
| 2014/0153231 | A1 | 6/2014 | Bittmann |
| 2014/0226320 | A1 | 8/2014 | Halliwell |

(56) References Cited

U.S. PATENT DOCUMENTS

| | | |
|---|---|---|
| 2014/0239827 A1 | 8/2014 | Park |
| 2014/0265900 A1 | 9/2014 | Sadwick et al. |
| 2015/0009688 A1 | 1/2015 | Timmermans |
| 2015/0077001 A1 | 3/2015 | Takahashi |
| 2015/0173138 A1 | 6/2015 | Roberts |
| 2015/0176770 A1* | 6/2015 | Wilcox .................. F21K 9/175 362/224 |
| 2015/0351171 A1 | 12/2015 | Tao et al. |
| 2016/0081147 A1* | 3/2016 | Guang ............... H05B 33/0803 315/123 |
| 2016/0091147 A1 | 3/2016 | Jiang et al. |
| 2016/0091156 A1 | 3/2016 | Li et al. |
| 2016/0091179 A1 | 3/2016 | Jiang et al. |
| 2016/0102813 A1 | 4/2016 | Ye et al. |
| 2016/0178135 A1 | 6/2016 | Xu et al. |
| 2016/0178137 A1 | 6/2016 | Jiang |
| 2016/0178138 A1 | 6/2016 | Jiang |
| 2016/0198535 A1 | 7/2016 | Ye et al. |
| 2016/0212809 A1 | 7/2016 | Xiong et al. |
| 2016/0215936 A1 | 7/2016 | Jiang |
| 2016/0215937 A1 | 7/2016 | Jiang |
| 2016/0219658 A1 | 7/2016 | Xiong et al. |
| 2016/0219666 A1 | 7/2016 | Xiong et al. |
| 2016/0219672 A1 | 7/2016 | Liu |
| 2016/0223180 A1 | 8/2016 | Jiang |
| 2016/0223182 A1 | 8/2016 | Jiang |
| 2016/0229621 A1 | 8/2016 | Jiang et al. |
| 2016/0255694 A1 | 9/2016 | Jiang et al. |
| 2016/0255699 A1 | 9/2016 | Ye et al. |
| 2016/0270163 A1 | 9/2016 | Hu et al. |
| 2016/0270164 A1 | 9/2016 | Xiong et al. |
| 2016/0270165 A1 | 9/2016 | Xiong et al. |
| 2016/0270166 A1 | 9/2016 | Xiong et al. |
| 2016/0270173 A1 | 9/2016 | Xiong |
| 2016/0270184 A1 | 9/2016 | Xiong et al. |
| 2016/0290566 A1 | 10/2016 | Jiang et al. |
| 2016/0290567 A1 | 10/2016 | Jiang et al. |
| 2016/0290568 A1 | 10/2016 | Jiang et al. |
| 2016/0290569 A1 | 10/2016 | Jiang et al. |
| 2016/0290570 A1 | 10/2016 | Jiang et al. |
| 2016/0290598 A1 | 10/2016 | Jiang |
| 2016/0290609 A1 | 10/2016 | Jiang et al. |
| 2016/0295706 A1 | 10/2016 | Jiang |
| 2016/0309550 A1 | 10/2016 | Xiong et al. |
| 2016/0323948 A1 | 11/2016 | Xiong et al. |
| 2016/0341414 A1 | 11/2016 | Jiang |
| 2016/0356472 A1 | 12/2016 | Liu et al. |
| 2016/0363267 A1 | 12/2016 | Jiang et al. |
| 2016/0381746 A1 | 12/2016 | Ye et al. |
| 2016/0381760 A1 | 12/2016 | Xiong et al. |
| 2017/0001793 A1 | 1/2017 | Jiang et al. |

FOREIGN PATENT DOCUMENTS

| | | |
|---|---|---|
| CN | 102155642 A | 8/2011 |
| CN | 202125774 U | 1/2012 |
| CN | 102355780 A | 2/2012 |
| CN | 102518972 A | 6/2012 |
| CN | 102932997 A | 2/2013 |
| CN | 203240337 | 10/2013 |
| CN | 203240337 U | 10/2013 |
| CN | 203384716 U | 1/2014 |
| CN | 203413396 U | 1/2014 |
| CN | 203453866 U | 2/2014 |
| CN | 203585876 U | 5/2014 |
| CN | 203927469 | 11/2014 |
| CN | 20400737 U | 4/2015 |
| CN | 204268162 | 4/2015 |
| CN | 104595765 A | 5/2015 |
| CN | 104735873 | 6/2015 |
| CN | 204420636 U | 6/2015 |
| EP | 2914065 | 9/2015 |
| GB | 2533683 | 6/2016 |
| WO | WO2011/132120 A1 | 10/2011 |
| WO | WO2012139691 | 10/2012 |
| WO | WO2013/125803 A1 | 8/2013 |
| WO | WO2014/001475 A1 | 1/2014 |
| WO | WO2015/036478 A1 | 3/2015 |

OTHER PUBLICATIONS

PCT Search Report for International Application No. PCT/CN2015/090814 dated Dec. 30, 2015.

* cited by examiner

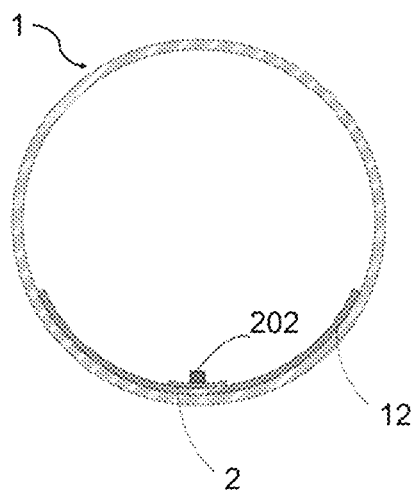
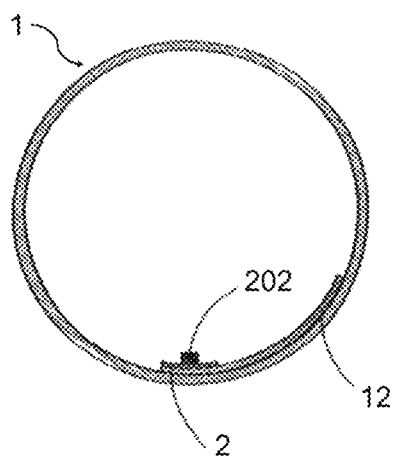
Fig. 6  Fig. 7
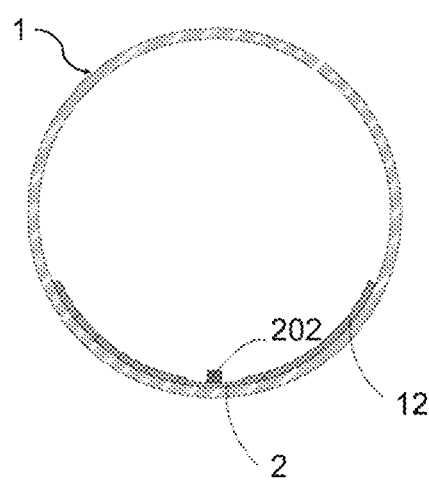
Fig. 8

LED TUBE LAMP

CROSS-REFERENCE TO RELATED APPLICATIONS

This application is a Continuation-in-Part application of U.S. patent application Ser. No. 14/865,387, filed Sep. 25, 2015, the contents of which are incorporated herein by reference in their entirety, which claims priority to Chinese Patent Applications No. CN 201410507660.9 filed on 2014 Sep. 28; CN 201410508899.8 filed on 2014 Sep. 28; CN 201410623355.6 filed on 2014 Nov. 6; CN 201410734425.5 filed on 2014 Dec. 5; CN 201510075925.7 filed on 2015 Feb. 12; CN 201510104823.3 filed on 2015 Mar. 10; CN 201510133689.x filed on 2015 Mar. 25; CN 201510134586.5 filed on 2015 Mar. 26; CN 201510136796.8 filed on 2015 Mar. 27; CN 201510155807.7 filed on 2015 Apr. 3; CN 201510173861.4 filed on 2015 Apr. 14; CN 201510193980.6 filed on 2015 Apr. 22; CN 201510259151.3 filed on 2015 May 19; CN 201510268927.8 filed on 2015 May 22; CN 201510284720.x filed on 2015 May 29; CN 201510315636.x filed on 2015 Jun. 10; CN 201510338027.6 filed on 2015 Jun. 17; CN 201510372375.5 filed on 2015 Jun. 26; CN 201510373492.3 filed on 2015 Jun. 26; CN 201510378322.4 filed on 2015 Jun. 29; CN 201510391910.1 filed on 2015 Jul. 2; CN 201510406595.5 filed on 2015 Jul. 10; CN 201510428680.1 filed on 2015 Jul. 20; CN 201510482944.1 filed on 2015 Aug. 7; CN 201510483475.5 filed on 2015 Aug. 8; CN 201510486115.0 filed on 2015 Aug. 8; CN 201510555543.4 filed on 2015 Sep. 2; CN 201510557717.0 filed on 2015 Sep. 6; and CN 201510595173.7 filed on 2015 Sep. 18, the disclosures of which are incorporated herein in their entirety by reference. This application also claims priority to Chinese Patent Applications No. CN 201510324394.0 filed on 2015 Jun. 12; CN 201510448220.5 filed on 2015 Jul. 27; CN 201510499512.1 filed on 2015 Aug. 14; CN 201510645134.3 filed on 2015 Oct. 8; and CN 201510716899.1 filed on 2015 Oct. 29, the disclosures of which are incorporated herein in their entirety by reference.

FIELD

The present disclosure relates to an LED tube lamp, and more particularly to an LED tube lamp and its components including an anti-flickering circuit.

BACKGROUND

Light emitting diode (LED) lighting technology is rapidly developing to replace traditional incandescent and fluorescent lighting. LED tube lamps are mercury-free in comparison with fluorescent tube lamps that need to be filled with inert gas and mercury. Thus, it is not surprising that LED tube lamps are becoming a highly desired illumination option among different available lighting systems used in homes and workplaces, which used to be dominated by traditional lighting options such as compact fluorescent light bulbs (CFLs) and fluorescent tube lamps. Benefits of LED tube lamps include improved durability and longevity and far less energy consumption; therefore, when taking into account all factors, they would typically be considered as a cost effective lighting option.

Typical LED tube lamps have a lamp tube, a circuit board disposed inside the lamp tube with light sources being mounted on the circuit board, and end caps accompanying a power supply provided at two ends of the lamp tube with the electricity from the power supply transmitting to the light sources through the circuit board.

The available electronic ballasts are mainly classified into two types of instant start electronic ballast and pre-heat start electronic ballast. The electronic ballast has a resonant circuit, which is designed to match a load characteristic of a fluorescent lamp to provide an appropriate ignition process for igniting the lamp. The load characteristic of the fluorescent lamp is capacitive before the lamp is ignited and is resistive after the lamp is ignited. The LED is a non-linear load, having a completely different load characteristic. Therefore, the LED tube lamp affects the resonance of the resonant circuit and tends to cause compatible problems. In general, the pre-heat electronic ballast detects the filament of the lamp during ignition process. However, the conventional LED driving circuit can not supply the filament detection and so can not light with the pre-heat electronic ballast. In addition, the electronic ballast is effectively a current source, and it easily results in the problems of over current, over voltage, under current and the under voltage when being used to be a power supply of the LED tube lamp. The LED tube lamp may not provide stable lighting and even the electrical device therein may be damaged. Moreover, a transient flicker may appear after the user turns off the power, which may cause user discomfort.

Accordingly, the present disclosure and its embodiments are herein provided.

SUMMARY

It's specially noted that the present disclosure may actually include one or more inventions claimed currently or not yet claimed, and for avoiding confusion due to unnecessarily distinguishing between those possible inventions at the stage of preparing the specification, the possible plurality of inventions herein may be collectively referred to as "the (present) invention" herein.

Various embodiments are summarized in this section, and are described with respect to the "present invention," which terminology is used to describe certain presently disclosed embodiments, whether claimed or not, and is not necessarily an exhaustive description of all possible embodiments, but rather is merely a summary of certain embodiments. Certain of the embodiments described below as various aspects of the "present invention" can be combined in different manners to form an LED tube lamp or a portion thereof.

The present invention provides a novel LED tube lamp, and aspects thereof.

In one embodiment, an LED tube lamp comprises a tube, a terminal adapter circuit, a first rectifying circuit, a filtering circuit, an LED lighting module and an anti-flickering circuit. The tube has a first pin and a second pin for receiving an external driving signal. The terminal adapter circuit has two fuses respectively coupled to the first and second pins. The first rectifying circuit is coupled to the first and second pins for rectifying the external driving signal to generate a rectified signal. The filtering circuit is coupled to the first rectifying circuit for filtering the rectified signal to generate a filtered signal. The LED lighting module is coupled to the filtering circuit and the LED lighting module having an LED module, wherein the LED lighting module is configured to receive the filtered signal and generate a driving signal, and the LED module receives the driving signal and emits light. The anti-flickering circuit is coupled between the filtering circuit and the LED lighting module, and is configured such that a current higher than a particular anti-flickering current flows through the anti-flickering circuit when a peak value of the filtered signal is higher than a minimum conduction voltage of the LED module.

The anti-flickering circuit may comprise at least one resistor.

The rectifying circuit may be a full-wave rectifying circuit.

In one embodiment, an LED tube lamp comprises an over voltage protection circuit coupled to a first filtering output terminal and a second output terminal of the filtering circuit to detect the filtered signal for clamping a voltage level of the filtered signal when the voltage level of the filtered signal is higher than a particular over voltage value.

The over voltage protection circuit may comprise a voltage clamping diode.

A frequency of the external driving signal may be in the range of 20 k-50 k Hz.

The LED module may comprise at least two LED units, and each LED unit may comprise at least two LEDs.

The first and second pins may be respectively disposed at two opposite end caps of the LED tube lamp to form a single pin at each end of LED tube lamp.

In one embodiment, an LED tube lamp comprises a second rectifying circuit coupled to a third pin and a fourth pin for rectifying the external driving signal concurrently with the first rectifying circuit.

The first and second pins may be disposed on one end cap of the LED tube lamp and the third and fourth pins are disposed on the other cap end thereof.

In one embodiment, an LED tube lamp comprises two filament-simulating circuits, wherein one filament-simulating circuit has filament-simulating terminals coupled to the first and second pins, and the other filament-simulating circuit has filament-simulating terminals coupled to the third and fourth pins.

In one embodiment, an LED tube lamp comprises a tube, a first rectifying circuit, a filtering circuit, an LED lighting module, an anti-flickering circuit and an over voltage protection circuit. The tube has a first pin and a second pin for receiving an external driving signal. The first rectifying circuit is coupled to the first and second pins for rectifying the external driving signal to generate a rectified signal. The filtering circuit is coupled to the first rectifying circuit for filtering the rectified signal to generate a filtered signal. The LED lighting module is coupled to the filtering circuit and the LED lighting module has a LED module, wherein the LED lighting module is configured to receive the filtered signal and generate a driving signal, and the LED module receives the driving signal and emits light. The anti-flickering circuit is coupled between the filtering circuit and the LED lighting module, and a current higher than a set, particular anti-flickering current flows through the anti-flickering circuit when a peak value of the filtered signal is higher than a minimum conduction voltage of the LED module. The over voltage protection circuit is coupled to a first filtering output terminal and a second output terminal of the filtering circuit to detect the filtered signal for clamping a voltage level of the filtered signal when the voltage level of the filtered signal is higher than a set, particular over voltage value.

The anti-flickering circuit may comprise at least one resistor.

The rectifying circuit may be a full-wave rectifying circuit.

The over voltage protection circuit may comprise a voltage clamping diode.

A frequency of the external driving signal may be in the range of 20 k-50 k Hz.

The LED module may comprise at least two LED units, and each LED unit may comprise at least two LEDs.

In one embodiment, an LED tube lamp comprises a second rectifying circuit coupled to a third pin and a fourth pin for rectifying the external driving signal concurrently with the first rectifying circuit.

In one embodiment, the first and second pins are disposed on one end cap of the LED tube lamp and the third and fourth pins are disposed on the other cap end thereof.

In one embodiment, an LED tube lamp comprises two filament-simulating circuits, wherein one filament-simulating circuit has filament-simulating terminals coupled to the first and second pins, and the other filament-simulating circuit has filament-simulating terminals coupled to the third and fourth pins.

In one embodiment an LED tube lamp comprises two fuses, wherein one fuse is coupled to the first pin and the other fuse is coupled to the second pin.

The first and second pins may be respectively disposed at two opposite end caps of the LED tube lamp to form a single pin at each end of LED tube lamp.

BRIEF DESCRIPTION OF THE DRAWINGS

FIG. 6 is a plane cross-sectional view schematically illustrating inside structure of the glass tube of the LED tube lamp according to still another embodiment of the present invention, wherein the reflective film is under the LED light strip and extends at both sides along the circumferential direction of the glass tube;

FIG. 7 is a plane cross-sectional view schematically illustrating inside structure of the glass tube of the LED tube lamp according to yet another embodiment of the present invention, wherein the reflective film is under the LED light strip and extends at only one side along the circumferential direction of the glass tube;

FIG. 8 is a plane cross-sectional view schematically illustrating inside structure of the glass tube of the LED tube lamp according to still yet another embodiment of the present invention, wherein two reflective films are respectively adjacent to two sides of the LED light strip and extend along the circumferential direction of the glass tube;

DETAILED DESCRIPTION

Figure 1:
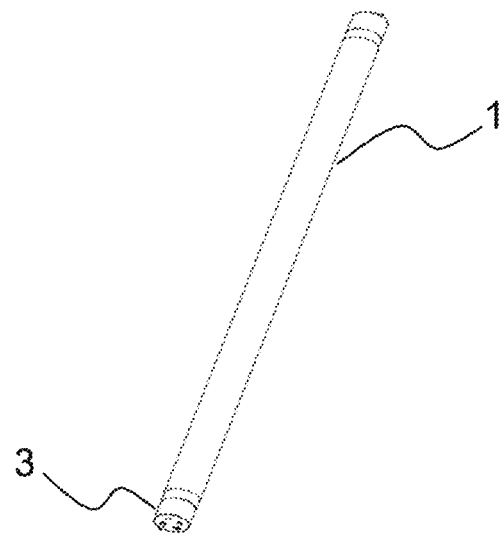
FIG. 1 is a perspective view schematically illustrating an LED tube lamp according to one embodiment of the present invention.

The present disclosure provides a novel LED tube lamp based on the glass made tube to address some of the shortcomings described above. The present disclosure will now be described in the following embodiments with reference to the drawings. The following descriptions of various embodiments of this invention are presented herein for purpose of illustration and giving examples only. It is not intended to be exhaustive or to be limited to the precise form disclosed. These example embodiments are just that—examples—and many implementations and variations are possible that do not require the details provided herein. It should also be emphasized that the disclosure provides details of alternative examples, but such listing of alternatives is not exhaustive. Furthermore, any consistency of detail between various examples should not be interpreted as requiring such detail—it is impracticable to list every possible variation for every feature described herein. The language of the claims should be referenced in determining the requirements of the invention.

In the drawings, the size and relative sizes of components may be exaggerated for clarity. Like numbers refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "and/or" includes any and all combinations of one or more of the associated listed items and may be abbreviated as "/".

It will be understood that, although the terms first, second, third etc. may be used herein to describe various elements, components, regions, layers, or steps, these elements, components, regions, layers, and/or steps should not be limited by these terms. Unless the context indicates otherwise, these terms are only used to distinguish one element, component, region, layer, or step from another element, component, region, or step, for example as a naming convention. Thus, a first element, component, region, layer, or step discussed below in one section of the specification could be termed a second element, component, region, layer, or step in another section of the specification or in the claims without departing from the teachings of the present invention. In addition, in certain cases, even if a term is not described using "first," "second," etc., in the specification, it may still be referred to as "first" or "second" in a claim in order to distinguish different claimed elements from each other.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

It will be understood that when an element is referred to as being "connected" or "coupled" to or "on" another element, it can be directly connected or coupled to or on the other element or intervening elements may be present. In contrast, when an element is referred to as being "directly connected" or "directly coupled" to another element, or as "contacting" another element, there are no intervening elements present. Other words used to describe the relationship between elements should be interpreted in a like fashion (e.g., "between" versus "directly between," "adjacent" versus "directly adjacent," etc.).

Embodiments described herein will be described referring to plan views and/or cross-sectional views by way of ideal schematic views. Accordingly, the exemplary views may be modified depending on manufacturing technologies and/or tolerances. Therefore, the disclosed embodiments are not limited to those shown in the views, but include modifications in configuration formed on the basis of manufacturing processes. Therefore, regions exemplified in figures may have schematic properties, and shapes of regions shown in figures may exemplify specific shapes of regions of elements to which aspects of the invention are not limited.

Spatially relative terms, such as "beneath," "below," "lower," "above," "upper" and the like, may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

Terms such as "same," "equal," "planar," or "coplanar," as used herein when referring to orientation, layout, location, shapes, sizes, amounts, or other measures do not necessarily mean an exactly identical orientation, layout, location, shape, size, amount, or other measure, but are intended to encompass nearly identical orientation, layout, location, shapes, sizes, amounts, or other measures within acceptable variations that may occur, for example, due to manufacturing processes. The term "substantially" may be used herein to reflect this meaning.

Terms such as "about" or "approximately" may reflect sizes, orientations, or layouts that vary only in a small relative manner, and/or in a way that does not significantly alter the operation, functionality, or structure of certain elements. For example, a range from "about 0.1 to about 1" may encompass a range such as a 0%-5% deviation around 0.1 and a 0% to 5% deviation around 1, especially if such deviation maintains the same effect as the listed range.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

As used herein, items described as being "electrically connected" are configured such that an electrical signal can be passed from one item to the other. Therefore, a passive electrically conductive component (e.g., a wire, pad, internal electrical line, etc.) physically connected to a passive electrically insulative component (e.g., a prepreg layer of a printed circuit board, an electrically insulative adhesive connecting two devices, an electrically insulative underfill or mold layer, etc.) is not electrically connected to that component. Moreover, items that are "directly electrically connected," to each other are electrically connected through one or more passive elements, such as, for example, wires, pads, internal electrical lines, resistors, etc. As such, directly electrically connected components do not include components electrically connected through active elements, such as transistors or diodes.

Components described as thermally connected or in thermal communication are arranged such that heat will follow a path between the components to allow the heat to transfer from the first component to the second component. Simply because two components are part of the same device or board does not make them thermally connected. In general, components which are heat-conductive and directly connected to other heat-conductive or heat-generating components (or connected to those components through intermediate heat-conductive components or in such close proximity as to permit a substantial transfer of heat) will be described as thermally connected to those components, or in thermal communication with those components. On the contrary, two components with heat-insulative materials therebetween, which materials significantly prevent heat transfer between the two components, or only allow for incidental heat transfer, are not described as thermally connected or in thermal communication with each other. The terms "heat-conductive" or "thermally-conductive" do not apply to any material that provides incidental heat conduction, but are intended to refer to materials that are typically known as good heat conductors or known to have utility for transferring heat, or components having similar heat conducting properties as those materials.

Figure 1A:
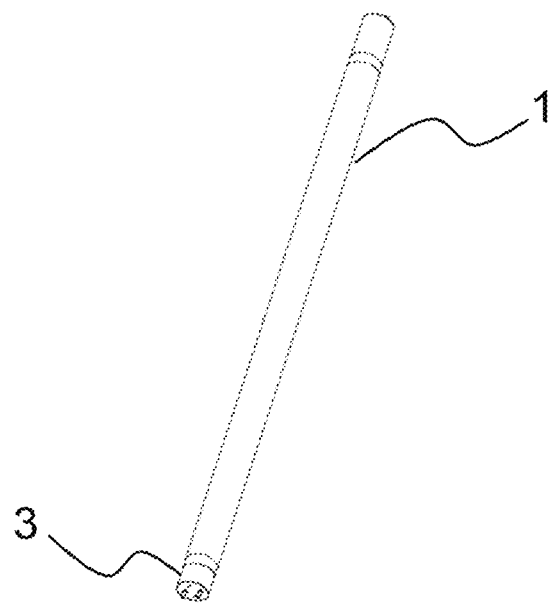
FIG. 1A is a perspective view schematically illustrating the different sized end caps of an LED tube lamp according to another embodiment of the present invention to illustrate.
Figure 2:
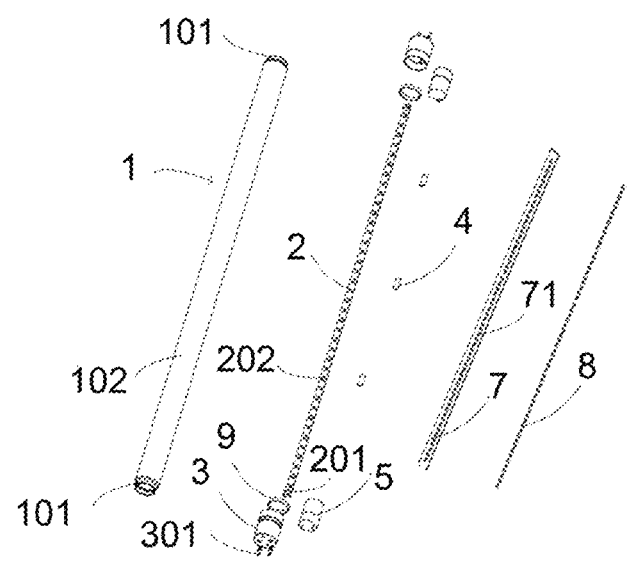
FIG. 2 is an exploded view schematically illustrating the LED tube lamp shown in FIG. 1.

Referring to FIGS. 1 and 2, an LED tube lamp of one embodiment of the present invention includes a glass tube 1, an LED light strip 2 disposed inside the glass tube 1, and two end caps 3 respectively disposed at two ends of the glass tube 1. The sizes of the two end caps 3 may be same or different. Referring to FIG. 1A, the size of one end cap may in some embodiments be about 30% to about 80% times the size of the other end cap. In one embodiment, the end cap is wholly made of a plastic material, and in one embodiment, the end cap is made by integral molding. In one embodiment, the end caps are made of a transparent plastic material and/or a thermal conductive plastic material.

Furthermore, in certain embodiments, the glass tube and the end cap are secured by a highly thermal conductive silicone gel, for example, with a thermal conductivity not less than 0.7 w/m·k. For example, in one embodiment the thermal conductivity of the highly thermal conductive silicone gel is not less than 2 w/m·k. In one embodiment, the highly thermal conducive silicone gel is of high viscosity, and the end cap and the end of the glass tube could be secured by using the highly thermal conductive silicone gel and therefore can be qualified in a torque test of 1.5 to 5 newton-meters (Nt-m) and/or in a bending test of 5 to 10 newton-meters (Nt-m).

In one embodiment, the glass tube could be covered by a heat shrink sleeve (not shown) to make the glass tube electrically insulated. For example, the thickness range of the heat shrink sleeve may be 20 μm-200 μm, and in some embodiments 50 μm-100 μm.

In some embodiments, the inner surface of the glass tube could be formed with a rough surface while the outer surface of the glass tube remains glossy. For example, the inner surface may be rougher than the outer surface. For example, the roughness Ra of the inner surface may be from 0.1 to 40 μm, and in some embodiments, from 1 to 20 μm.

In some embodiments, controlled roughness of the surface is obtained mechanically by a cutter grinding against a workpiece, deformation on a surface of a workpiece being cut off, or high frequency vibration in the manufacturing system. Alternatively, roughness may be obtained chemically by etching a surface. Depending on the luminous effect the glass tube is designed to produce, a suitable combination of amplitude and frequency of a roughened surface is provided by a matching combination of workpiece and finishing technique.

In some embodiments, the LED tube lamp is configured to reduce internal reflectance by applying a layer of anti-reflection coating to an inner surface of the glass tube. The coating has an upper boundary, which divides the inner surface of the glass tube and the anti-reflection coating, and a lower boundary, which divides the anti-reflection coating and the air in the glass tube. Light waves reflected by the upper and lower boundaries of the coating interfere with one another to reduce reflectance. The coating is made from a material with a refractive index of a square root of the refractive index of the glass tube by vacuum deposition. Tolerance of the refractive index is ±20%. The thickness of the coating is chosen to produce destructive interference in the light reflected from the interfaces and constructive interference in the corresponding transmitted light. In some embodiments, reflectance is further reduced by using alternating layers of a low-index coating and a higher-index coating. The multi-layer structure is designed to, when setting parameters such as combination and permutation of layers, thickness of a layer, refractive index of the material, give low reflectivity over a broad band that covers at least 60%, or preferably, 80% of the wavelength range beaming from the LED light source 202. In some embodiments, three successive layers of anti-reflection coatings are applied to an inner surface of the glass tube 1 to obtain low reflectivity over a wide range of frequencies. The thicknesses of the coatings are chosen to give the coatings optical depths of, respectively, one half, and one quarter of the wavelength range coming from the LED light source 202. Dimensional tolerance for the thickness of the coating is set at ±20%.

In some embodiments, the terminal part of the glass tube to be in contact with (e.g., to touch) the end cap includes a protrusion region which could be formed to rise inwardly or outwardly. Furthermore, the outer surface of the protrusion region may be rougher than the outer surface of the glass tube. These protrusion regions help to contribute larger contact surface areas for the adhesives between the glass tube and the end caps such that the connection between the end caps and the glass tube become more secure.

Figure 3:
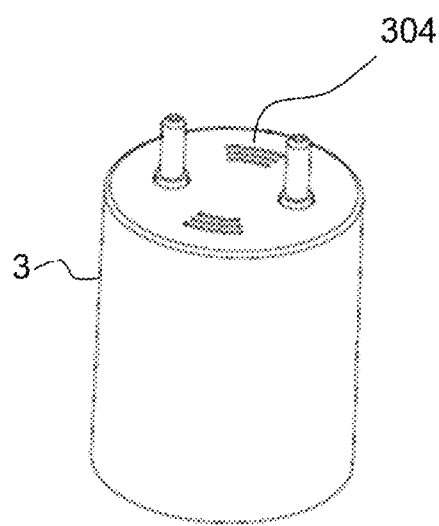
FIG. 3 is a perspective view schematically illustrating front and top of an end cap of the LED tube lamp according to one embodiment of the present invention.

Referring to FIGS. 2, and 3, in one embodiment, the end cap 3 may have openings 304 to dissipate heat generated by the power supply modules inside the end cap 3 so as to prevent a high temperature condition inside the end cap 3 that might reduce reliability. In some embodiments, the openings are in a curved shape such as a shape of arc; especially in shape of three arcs with different size. In one embodiment, the openings are in a shape of three arcs with gradually varying size. The openings on the end cap 3 can be in any one of the above-mentioned shape or any combination thereof.

In other embodiments, the end cap 3 is provided with a socket (not shown) for installing the power supply module.

Figures 4, 5:
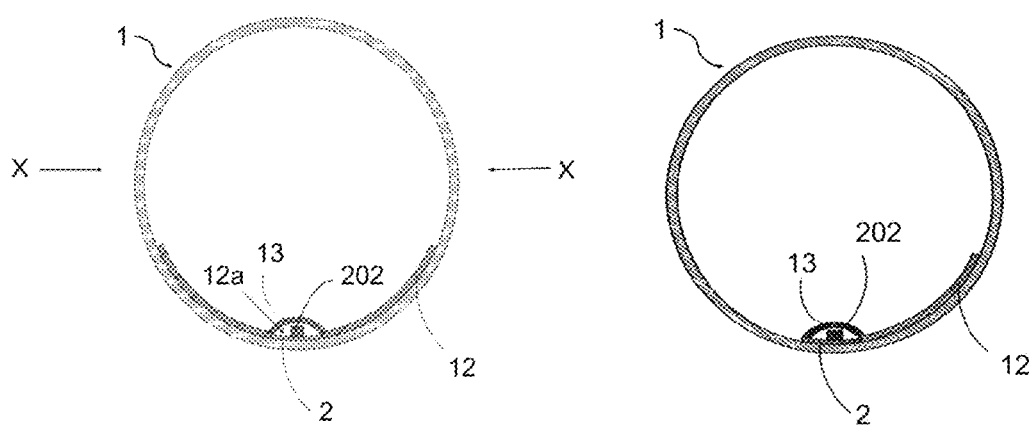
FIG. 4 is a plane cross-sectional view schematically illustrating inside structure of the glass tube of the LED tube lamp according to one embodiment of the present invention, wherein two reflective films are respectively adjacent to two sides of the LED light strip along the circumferential direction of the glass tube.
FIG. 5 is a plane cross-sectional view schematically illustrating inside structure of the glass tube of the LED tube lamp according to another embodiment of the present invention, wherein only a reflective film is disposed on one side of the LED light strip along the circumferential direction of the glass tube.

Referring to FIG. 4, in one embodiment, the glass tube 1 further has a diffusion film 13 coated and bonded to the inner wall thereof so that the light outputted or emitted from the LED light sources 202 is diffused by the diffusion film 13 and then pass through the glass tube 1. The diffusion film 13 can be in form of various types, such as a coating onto the inner wall or outer wall of the glass tube 1, or a diffusion coating layer (not shown) coated at the surface of each LED light source 202, or a separate membrane covering the LED light source 202.

Referring again to FIG. 4, when the diffusion film 13 is in form of a sheet, it covers but is not in contact with the LED light sources 202. The diffusion film 13 in form of a sheet is usually called an optical diffusion sheet or board, usually a composite made of mixing diffusion particles into polystyrene (PS), polymethyl methacrylate (PMMA), polyethylene terephthalate (PET), and/or polycarbonate (PC), and/or any combination thereof. The light passing through such composite is diffused to expand in a wide range of space such as a light emitted from a plane source, and therefore makes the brightness of the LED tube lamp uniform.

In alternative embodiments, the diffusion film 13 is in form of an optical diffusion coating, which is composed of any one of calcium carbonate, halogen calcium phosphate and aluminum oxide, or any combination thereof. When the optical diffusion coating is made from a calcium carbonate with suitable solution, an excellent light diffusion effect and transmittance to exceed 90% can be obtained.

In certain embodiments, the composition of the diffusion film 13 in form of the optical diffusion coating includes calcium carbonate, strontium phosphate (e.g., CMS-5000, white powder), thickener, and a ceramic activated carbon (e.g., ceramic activated carbon SW-C, which is a colorless liquid). Specifically, in some embodiments, such an optical diffusion coating on the inner circumferential surface of the glass tube has an average thickness ranging between about 20 to about 30 µm. A light transmittance of the diffusion film 13 using this optical diffusion coating is about 90%. Generally speaking, the light transmittance of the diffusion film 13 ranges from 85% to 96%. In addition, this diffusion film 13 can also provide electrical isolation for reducing risk of electric shock to a user upon breakage of the glass tube 1. Furthermore, the diffusion film 13 provides an improved illumination distribution uniformity of the light outputted by the LED light sources 202 such that the light can illuminate the back of the light sources 202 and the side edges of the bendable circuit sheet so as to avoid the formation of dark regions inside the glass tube 1 and improve the illumination comfort. In another possible embodiment, the light transmittance of the diffusion film can be 92% to 94% while the thickness ranges from about 200 to about 300 µm.

In another embodiment, the optical diffusion coating can also be made of a mixture including calcium carbonate-based substance, some reflective substances like strontium phosphate or barium sulfate, a thickening agent, ceramic activated carbon, and deionized water. The mixture is coated on the inner circumferential surface of the glass tube and has an average thickness ranging between about 20 to about 30 µm. In view of the diffusion phenomena in microscopic terms, light is reflected by particles. The particle size of the reflective substance such as strontium phosphate or barium sulfate will be much larger than the particle size of the calcium carbonate. Therefore, adding a small amount of reflective substance in the optical diffusion coating can effectively increase the diffusion effect of light.

In other embodiments, halogen calcium phosphate or aluminum oxide can also serve as the main material for forming the diffusion film 13. The particle size of the calcium carbonate is about 2 to 4 µm, while the particle size of the halogen calcium phosphate and aluminum oxide are about 4 to 6 µm and 1 to 2 µm, respectively. In one embodiment, when the light transmittance is desired to be 85% to 92%, the average thickness for the optical diffusion coating mainly having the calcium carbonate is about 20 to about 30 µm, while the average thickness for the optical diffusion coating mainly having the halogen calcium phosphate may be about 25 to about 35 µm, and the average thickness for the optical diffusion coating mainly having the aluminum oxide may be about 10 to about 15 µm. However, in embodiments when the desired light transmittance is 92% and even higher, the optical diffusion coating mainly having the calcium carbonate, the halogen calcium phosphate, or the aluminum oxide may be thinner than the minimum range values described above.

The main material and the corresponding thickness of the optical diffusion coating can be decided according to the place for which the glass tube 1 is used and the light transmittance desired or required. Generally, the higher the light transmittance of the diffusion film, the more grainy the appearance of the light sources will be.

Referring to FIG. 4, the inner circumferential surface of the glass tube 1 may also be provided or bonded with a reflective film 12. The reflective film 12 is provided around the LED light sources 202, and occupies a portion of an area of the inner circumferential surface of the glass tube 1 arranged along the circumferential direction thereof. As shown in FIG. 4, the reflective film 12 is disposed at two sides of the LED light strip 2 extending along a circumferential direction of the glass tube 1. The LED light strip 2 is basically in a middle position of the glass tube 1 and between the two reflective films 12. The reflective film 12, when viewed by a person looking at the glass tube from the side (in the X-direction shown in FIG. 4), serves to block the LED light sources 202, so that the person does not directly see the LED light sources 202, thereby reducing the visual graininess effect. On the other hand, reflection of the lights emitted from the LED light sources 202 by the reflective film 12 facilitates the divergence angle control of the LED tube lamp, so that more light illuminates toward directions without the reflective film 12, such that the LED tube lamp has higher energy efficiency when providing the same level of illumination performance.

Specifically, the reflection film 12 is provided on the inner peripheral surface of the glass tube 1, and has an opening 12a configured to accommodate the LED light strip 2. The size of the opening 12a is the same or slightly larger than the size of the LED light strip 2. During assembly, the LED light sources 202 are mounted on the LED light strip 2 (a bendable circuit sheet) provided on the inner surface of the glass tube 1, and then the reflective film 12 is adhered to the inner surface of the glass tube 1, so that the opening 12a of the reflective film 12 correspondingly matches the LED light strip 2 in a one-to-one relationship, and the LED light strip 2 is exposed to the outside of the reflective film 12.

In one embodiment, the reflectance of the reflective film 12 is generally at least greater than 85%, in some embodiments greater than 90%, and in some embodiments greater than 95%, to be most effective. In one embodiment, the reflective film 12 extends circumferentially along the length of the glass tube 1 occupying about 30% to 50% of the inner surface area of the glass tube 1. For example, a ratio of a circumferential length of the reflective film 12 along the inner circumferential surface of the glass tube 1 to a circumferential length of the glass tube 1 may be about 0.3 to 0.5. In the illustrated embodiment of FIG. 4, the reflective film 12 is disposed substantially in the middle along a circumferential direction of the glass tube 1, so that the two distinct portions or sections of the reflective film 12 disposed on the two sides of the LED light strip 2 are substantially equal in area. The reflective film 12 may be made of PET with some reflective materials such as strontium phosphate or barium sulfate or any combination thereof, with a thickness between about 140 µm and about 350 µm or between about 150 µm and about 220 µm for a more preferred effect in some embodiments. As shown in FIG. 5, in other embodiments, the reflective film 12 may be provided along the circumferential direction of the glass tube 1 on only side of the LED light strip 2 occupying the same percentage of the inner surface area of the glass tube 1 (e.g., 15% to 25% for the one side). Alternatively, as shown in FIGS. 6 and 7, the reflective film 12 may be provided without any opening, and the reflective film 12 is directly adhered or mounted to the inner surface of the glass tube 1 and followed by mounting or fixing the LED light strip 2 on the reflective film 12 such that the reflective film 12 positioned on one side or two sides of the LED light strip 2.

In the above mentioned embodiments, various types of the reflective film 12 and the diffusion film 13 can be adopted to accomplish optical effects including single reflection, single diffusion, and/or combined reflection-diffusion. For example, the glass tube 1 may be provided with only the reflective film 12, and no diffusion film 13 is disposed inside the glass tube 1, such as shown in FIGS. 6, 7, and 8.

In other embodiments, the width of the LED light strip 2 (along the circumferential direction of the glass tube) can be widened to occupy a circumference area of the inner circumferential surface of the glass tube 1. According to certain embodiments, since the LED light strip 2 has on its surface a circuit protective layer made of an ink which can reflect lights, the widened part of the LED light strip 2 functions like the reflective film 12 as mentioned above. In some embodiments, a ratio of the length of the LED light strip 2 along the circumferential direction to the circumferential length of the glass tube 1 is about 0.2 to 0.5. The light emitted from the light sources could be concentrated by the reflection of the widened part of the LED light strip 2.

In other embodiments, the inner surface of the glass made glass tube may be coated totally with the optical diffusion coating, or partially with the optical diffusion coating (where the reflective film 12 is coated have no optical diffusion coating). According to certain embodiments, no matter in what coating manner, it is better that the optical diffusion coating be coated on the outer surface of the rear end region of the glass tube 1 so as to firmly secure the end cap 3 with the glass tube 1.

In the present embodiments, the light emitted from the light sources may be processed with the abovementioned diffusion film, reflective film, other kind of diffusion layer sheet, adhesive film, or any combination thereof.

Referring again to FIG. 2, the LED tube lamp according to some embodiments also includes an adhesive sheet 4, an insulation adhesive sheet 7, and an optical adhesive sheet 8. The LED light strip 2 is fixed by the adhesive sheet 4 to an inner circumferential surface of the glass tube 1. The adhesive sheet 4 may be but is not limited to a silicone adhesive. The adhesive sheet 4 may be in form of several short pieces or a long piece. Various kinds of the adhesive sheet 4, the insulation adhesive sheet 7, and the optical adhesive sheet 8 can be combined to constitute various embodiments.

In one embodiment, the insulation adhesive sheet 7 is coated on the surface of the LED light strip 2 that faces the LED light sources 202 so that the LED light strip 2 is not exposed and thus is electrically insulated from the outside environment. In application of the insulation adhesive sheet 7, a plurality of through holes 71 on the insulation adhesive sheet 7 are reserved to correspondingly accommodate the LED light sources 202 such that the LED light sources 202 are mounted in the through holes 101. The material composition of the insulation adhesive sheet 7 may include, for example, vinyl silicone, hydrogen polysiloxane and aluminum oxide. In certain embodiments, the insulation adhesive sheet 7 has a thickness ranging from about 100 µm to about 140 µm (micrometers). The insulation adhesive sheet 7 having a thickness less than 100 µm typically does not produce sufficient insulating effect, while the insulation adhesive sheet 7 having a thickness more than 140 µm may result in material waste.

Figure 24:
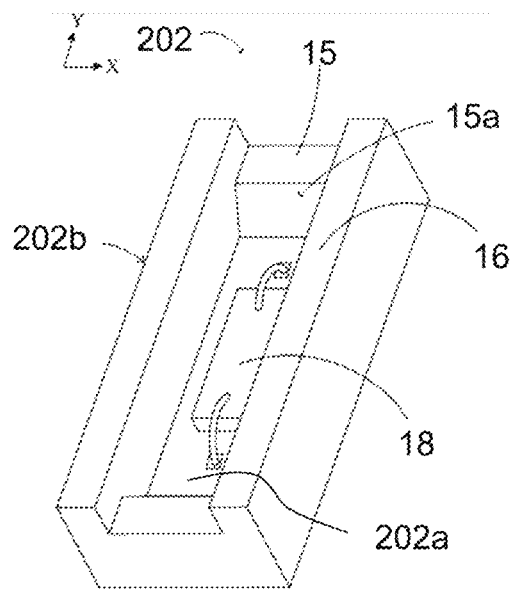
FIG. 24 is a perspective view schematically illustrating an LED lead frame for the LED light sources of the LED tube lamp according to one embodiment of the present invention.

The optical adhesive sheet 8, which in some embodiments is a clear or transparent material, is applied or coated on the surface of the LED light source 202 in order to facilitate optimal light transmittance. After being applied to the LED light sources 202, the optical adhesive sheet 8 may have a granular, strip-like or sheet-like shape. The performance of the optical adhesive sheet 8 depends on its refractive index and thickness. The refractive index of the optical adhesive sheet 8 is in some embodiments between 1.22 and 1.6. In some embodiments, it is better for the optical adhesive sheet 8 to have a refractive index being a square root of the refractive index of the housing or casing of the LED light source 202, or the square root of the refractive index of the housing or casing of the LED light source 202 plus or minus 15%, to contribute better light transmittance. The housing/casing of the LED light sources 202 is a structure to accommodate and carry the LED dies (or chips) such as a LED lead frame 202b as shown in FIG. 24. The refractive index of the optical adhesive sheet 8 may range from 1.225 to 1.253. In some embodiments, the thickness of the optical adhesive sheet 8 may range from 1.1 mm to 1.3 mm. The optical adhesive sheet 8 having a thickness less than 1.1 mm may not be able to cover the LED light sources 202, while the optical adhesive sheet 8 having a thickness more than 1.3 mm may reduce light transmittance and increases material cost.

Figure 9:
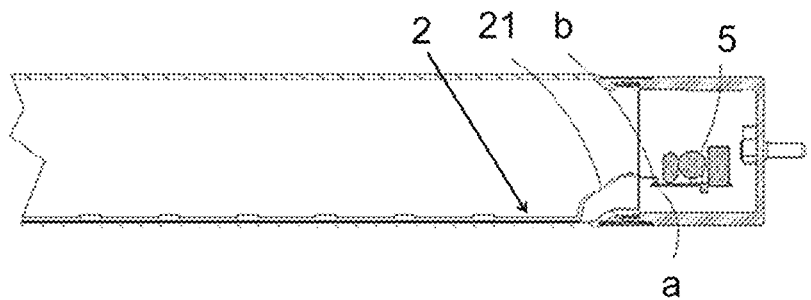
FIG. 9 is a plane sectional view schematically illustrating the LED light strip is a bendable circuit sheet with ends thereof passing across the glass tube of the LED tube lamp to be solder bonded to the output terminals of the power supply according to one embodiment of the present invention.

In an exemplary process of assembling the LED light sources to the LED light strip, the optical adhesive sheet 8 is first applied on the LED light sources 202; then the insulation adhesive sheet 7 is coated on one side of the LED light strip 2; then the LED light sources 202 are fixed or mounted on the LED light strip 2; the other side of the LED light strip 2 being opposite to the side of mounting the LED light sources 202 is bonded and affixed to the inner surface of the glass tube 1 by the adhesive sheet 4; finally, the end cap 3 is fixed to the end portion of the glass tube 1, and the LED light sources 202 and the power supply 5 are electrically connected by the LED light strip 2. As shown in FIG. 9, the bendable circuit sheet 2 has a freely extending portion 21 that bends away from the glass tube 1 to be soldered or traditionally wire-bonded with the power supply 5 to form a complete LED tube lamp.

In this embodiment, the LED light strip 2 is fixed by the adhesive sheet 4 to an inner circumferential surface of the glass tube 1, so as to increase the light illumination angle of the LED tube lamp and broaden the viewing angle to be greater than 330 degrees. By means of applying the insulation adhesive sheet 7 and the optical adhesive sheet 8, electrical insulation of the entire light strip 2 is accomplished such that electrical shock would not occur even when the glass tube 1 is broken and therefore safety could be improved.

Furthermore, the inner peripheral surface or the outer circumferential surface of the glass made glass tube 1 may be covered or coated with an adhesive film (not shown) to isolate the inside from the outside of the glass made glass tube 1 when the glass made glass tube 1 is broken. In this embodiment, the adhesive film is coated on the inner peripheral surface of the glass tube 1. The material for the coated adhesive film includes, for example, methyl vinyl silicone oil, hydro silicone oil, xylene, and calcium carbonate, wherein xylene is used as an auxiliary material. The xylene will be volatilized and removed when the coated adhesive film on the inner surface of the glass tube 1 solidifies or hardens. The xylene is mainly used to adjust the capability of adhesion and therefore to control the thickness of the coated adhesive film.

In one embodiment, the thickness of the coated adhesive film is in some examples between about 100 and about 140 micrometers ($\mu m$). The adhesive film having a thickness being less than 100 micrometers may not have sufficient shatterproof capability for the glass tube, and the glass tube is thus prone to crack or shatter. The adhesive film having a thickness being larger than 140 micrometers may reduce the light transmittance and also increases material cost. The thickness of the coated adhesive film may be between about 10 and about 800 micrometers ($\mu m$) when the shatterproof capability and the light transmittance are not strictly demanded.

In certain embodiments, the inner peripheral surface or the outer circumferential surface of the glass made glass tube 1 is coated with an adhesive film such that the broken pieces are adhered to the adhesive film when the glass made glass tube is broken. Therefore, the glass tube 1 would not be penetrated to form a through hole connecting the inside and outside of the glass tube 1 and thus prevents a user from touching any charged object inside the glass tube 1 to avoid electrical shock. In addition, the adhesive film is able to diffuse light and allows the light to transmit such that the light uniformity and the light transmittance of the entire LED tube lamp increases. The adhesive film can be used in combination with the adhesive sheet 4, the insulation adhesive sheet 7 and the optical adhesive sheet 8 to constitute various embodiments of the present disclosure. In some embodiments, when the LED light strip 2 is configured to be a bendable circuit sheet, no coated adhesive film is thereby used.

In certain embodiments, a bendable circuit sheet is adopted as the LED light strip 2 so that such an LED light strip 2 would not allow a ruptured or broken glass tube to maintain a straight shape, and therefore would instantly inform the user of the disability of the LED tube lamp and avoid possibly incurred electrical shock.

Figure 10:
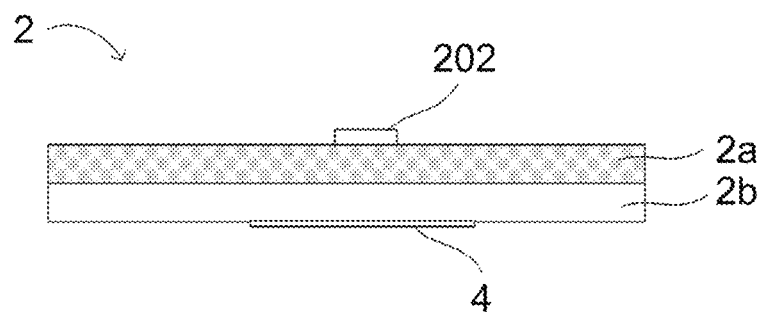
FIG. 10 is a plane cross-sectional view schematically illustrating a bi-layered structure of the bendable circuit sheet of the LED light strip of the LED tube lamp according to an embodiment of the present invention.

Referring to FIG. 10, in one embodiment, the LED light strip 2 includes a bendable circuit sheet having a metal layer 2a and a dielectric layer 2b that are arranged in a stacked manner, wherein the metal layer 2a is electrically conductive and may be a patterned wiring layer. The metal layer 2a and the dielectric layer 2b may have same areas. The LED light source 202 is disposed on one surface of the metal layer 2a, the dielectric layer 2b is disposed on the other surface of the metal layer 2a that is away from the LED light sources 202. The metal layer 2a is electrically connected to the power supply 5 to carry direct current (DC) signals. Meanwhile, the surface of the dielectric layer 2b away from the metal layer 2a is fixed to the inner circumferential surface of the glass tube 1 by means of the adhesive sheet 4. For example, the LED light strip 2 may have a bendable circuit sheet being made of only the single metal layer 2a or a two-layered structure having the metal layer 2a and the dielectric layer 2b. In this case, the structure of the bendable circuit sheet can be thinned and the metal layer originally attached to the tube wall of the glass tube can be removed. Even more, only the single metal layer 2a for power wiring is kept. Therefore, the LED light source utilization efficiency is improved. This is quite different from the typical flexible circuit board having a three-layered structure (one dielectric layer sandwiched with two metal layers). The bendable circuit sheet is accordingly more bendable or flexible to curl when compared with the conventional three-layered flexible substrate. As a result, the bendable circuit sheet of the LED light strip 2 can be installed in a glass tube with a customized shape or non-tubular shape, and fitly mounted to the inner surface of the glass tube.

In another embodiment, the outer surface of the metal layer 2a or the dielectric layer 2b may be covered with a circuit protective layer made of an ink with a function of resisting soldering and increasing reflectivity. Alternatively, the dielectric layer can be omitted and the metal layer can be directly bonded to the inner circumferential surface of the glass tube, and the outer surface of the metal layer 2a is coated with the circuit protective layer. No matter whether the bendable circuit sheet is one-layered structure made of just single metal layer 2a, or a two-layered structure made of one single metal layer 2a and one dielectric layer 2b, the circuit protective layer can be adopted. The circuit protective layer can be disposed only on one side/surface of the LED light strip 2, such as the surface having the LED light source 202. The bendable circuit sheet closely mounted to the inner surface of the glass tube is preferable in some cases. In addition, using fewer layers of the bendable circuit sheet improves the heat dissipation and lowers the material cost.

Moreover, the length of the bendable circuit sheet could be greater than the length of the glass tube.

In other embodiments, the LED light strip may be replaced by a hard substrate such as an aluminum substrate, a ceramic substrate or a fiberglass substrate having two-layered structure.

Referring to FIG. 2, in one embodiment, the LED light strip 2 has a plurality of LED light sources 202 mounted thereon, and the end cap 3 has a power supply 5 installed therein. The LED light sources 202 and the power supply 5 are electrically connected by the LED light strip 2. The power supply 5 may be a single integrated unit (i.e., all of the power supply components are integrated into one module unit) installed in one end cap 3. Alternatively, the power supply 5 may be divided into two separate units (i.e. all of the power supply components are divided into two parts) installed in two end caps 3, respectively.

The power supply 5 can be fabricated by various ways. For example, the power supply 5 may be an encapsulation body formed by injection molding a silicone gel with high thermal conductivity such as being greater than 0.7 w/m·k. This kind of power supply has advantages of high electrical insulation, high heat dissipation, and regular shape to match other components in an assembly. Alternatively, the power supply 5 in the end caps may be a printed circuit board having components that are directly exposed or packaged by a conventional heat shrink sleeve. The power supply 5 according to some embodiments of the present disclosure can be a single printed circuit board provided with a power supply module as shown in FIG. 9 or a single integrated unit as shown in FIG. 25.

Figure 25:
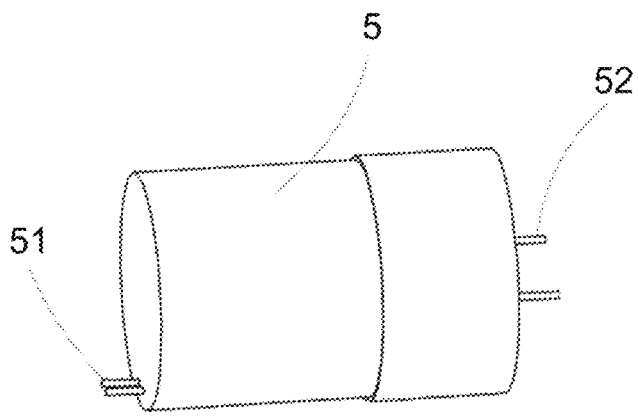
FIG. 25 is a perspective view schematically illustrating a power supply of the LED tube lamp according to one embodiment of the present invention.

Referring to FIGS. 2 and 25, in one embodiment, the power supply 5 is provided with a male plug 51 at one end and a metal pin 52 at the other end, one end of the LED light strip 2 is correspondingly provided with a female plug 201, and the end cap 3 is provided with a hollow conductive pin 301 to be connected with an outer electrical power source. Specifically, the male plug 51 is fittingly inserted into the female plug 201 of the LED light strip 2, while the metal pins 52 are fittingly inserted into the hollow conductive pins 301 of the end cap 3. The male plug 51 and the female plug 201 function as a connector between the power supply 5 and the LED light strip 2. Upon insertion of the metal pin 502, the hollow conductive pin 301 is punched with an external punching tool to slightly deform such that the metal pin 502 of the power supply 5 is secured and electrically connected to the hollow conductive pin 301. Upon turning on the electrical power, the electrical current passes in sequence through the hollow conductive pin 301, the metal pin 52, the male plug 51, and the female plug 201 to reach the LED light strip 2 and go to the LED light sources 202. However, the power supply 5 of the present invention is not limited to the modular type as shown in FIG. 25. The power supply 5 may be a printed circuit board provided with a power supply module and electrically connected to the LED light strip 2 via the abovementioned the male plug 51 and female plug 52 combination. In another embodiment, the power supply and the LED light strip may connect to each other by providing at the end of the power supply with a female plug and at the end of the LED light strip with a male plug. The hollow conductive pin 301 may be one or two in number.

In another embodiment, a traditional wire bonding technique can be used instead of the male plug 51 and the female plug 52 for connecting any kind of the power supply 5 and the light strip 2. Furthermore, the wires may be wrapped with an electrically insulating tube to protect a user from being electrically shocked. However, the bonded wires tend to be easily broken during transportation and can therefore cause quality issues.

In still another embodiment, the connection between the power supply 5 and the LED light strip 2 may be accomplished via tin soldering, rivet bonding, or welding. One way to secure the LED light strip 2 is to provide the adhesive sheet 4 at one side thereof and adhere the LED light strip 2 to the inner surface of the glass tube 1 via the adhesive sheet 4. Two ends of the LED light strip 2 can be either fixed to or detached from the inner surface of the glass tube 1.

In case that two ends of the LED light strip 2 are fixed to the inner surface of the glass tube 1, it may be preferable that the bendable circuit sheet of the LED light strip 2 is provided with the female plug 201 and the power supply is provided with the male plug 51 to accomplish the connection between the LED light strip 2 and the power supply 5. In this case, the male plug 51 of the power supply 5 is inserted into the female plug 201 to establish electrically conductive.

In case that two ends of the LED light strip 2 are detached from the inner surface of the glass tube and that the LED light strip 2 is connected to the power supply 5 via wire-bonding, any movement in subsequent transportation is likely to cause the bonded wires to break. Therefore, a desirable option for the connection between the light strip 2 and the power supply 5 could be soldering. Specifically, referring to FIG. 9, the ends of the LED light strip 2 including the bendable circuit sheet are arranged to pass over and directly soldering bonded to an output terminal of the power supply 5 such that the product quality is improved without using wires. In this way, the female plug 201 and the male plug 51 respectively provided for the LED light strip 2 and the power supply 5 are no longer needed.

Figure 11:
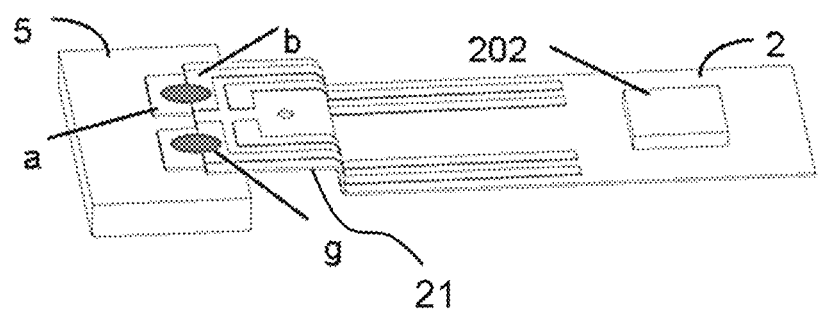
FIG. 11 is a perspective view schematically illustrating the soldering pad of the bendable circuit sheet of the LED light strip for soldering connection with the printed circuit board of the power supply of the LED tube lamp according to one embodiment of the present invention.
Figure 17:
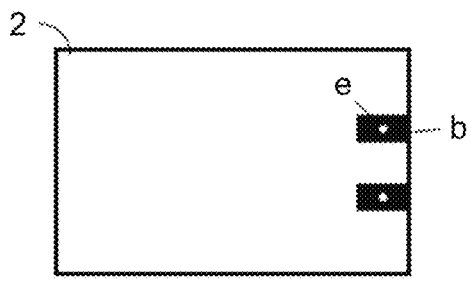
FIG. 17 is a plane view schematically illustrating through holes are formed on the soldering pads of the bendable circuit sheet of the LED light strip of the LED tube lamp according to one embodiment of the present invention.

Referring to FIG. 11, an output terminal of the printed circuit board of the power supply 5 may have soldering pads "a" provided with an amount of tin solder with a thickness sufficient to later form a solder joint. Correspondingly, the ends of the LED light strip 2 may have soldering pads "b". The soldering pads "a" on the output terminal of the printed circuit board of the power supply 5 are soldered to the soldering pads "b" on the LED light strip 2 via the tin solder on the soldering pads "a". The soldering pads "a" and the soldering pads "b" may be face to face during soldering such that the connection between the LED light strip 2 and the printed circuit board of the power supply 5 is the most firm. However, this kind of soldering may be implemented with a thermo-compression head pressing on the rear surface of the LED light strip 2 and heating the tin solder, i.e. the LED light strip 2 intervenes between the thermo-compression head and the tin solder, and therefor may easily cause reliability issues. Referring to FIG. 17, a through hole may be formed in each of the soldering pads "b" on the LED light strip 2 to allow the soldering pads "b" to overlay the soldering pads "b" without being face-to-face, and the thermo-compression head directly presses tin solders on the soldering pads "a" on surface of the printed circuit board of the power supply 5 when the soldering pads "a" and the soldering pads "b" are vertically aligned.

Referring again to FIG. 11, two ends of the LED light strip 2 detached from the inner surface of the glass tube 1 are formed as freely extending portions 21, while most of the LED light strip 2 is attached and secured to the inner surface of the glass tube 1. One of the freely extending portions 21 has the soldering pads "b" as mentioned above. Upon assembling of the LED tube lamp, the freely extending end portions 21 along with the soldered connection of the printed circuit board of the power supply 5 and the LED light strip 2 would be coiled, curled up or deformed to be fittingly accommodated inside the glass tube 1. In this manner, the freely extending end portions 21 may be bent away from the glass tube 1. In this embodiment, during the connection of the LED light strip 2 and the power supply 5, the soldering pads "b" and the soldering pads "a" and the LED light sources 202 are on surfaces facing toward the same direction and the soldering pads "b" on the LED light strip 2 are each formed with a through hole "e" as shown in FIG. 17 such that the soldering pads "b" and the soldering pads "a" communicate with each other via the through holes "e". When the freely extending end portions 21 are deformed due to contraction or curling up, the soldered connection of the printed circuit board of the power supply 5 and the LED light strip 2 exerts a lateral tension on the power supply 5. Furthermore, the soldered connection of the printed circuit board of the power supply 5 and the LED light strip 2 also exerts a downward tension on the power supply 5 when compared with the situation where the soldering pads "a" of the power supply 5 and the soldering pads "b" of the LED light strip 2 are face to face. This downward tension on the power supply 5 comes from the tin solders inside the through holes "e" and forms a stronger and more secure electrically conductive between the LED light strip 2 and the power supply 5.

Figure 12:
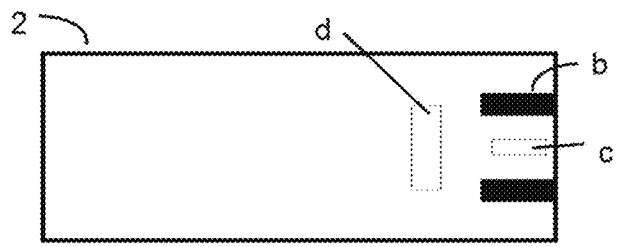
FIG. 12 is a plane view schematically illustrating the arrangement of the soldering pads of the bendable circuit sheet of the LED light strip of the LED tube lamp according to one embodiment of the present invention.
Figure 13:
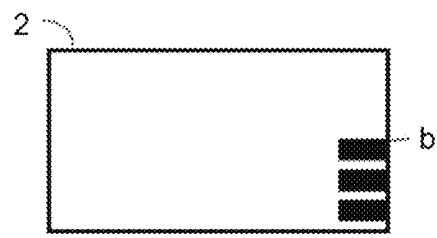
FIG. 13 is a plane view schematically illustrating a row of three soldering pads of the bendable circuit sheet of the LED light strip of the LED tube lamp according to another embodiment of the present invention.
Figure 14:
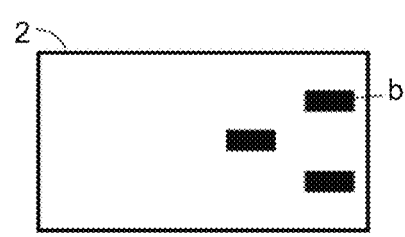
FIG. 14 is a plane view schematically illustrating two rows of soldering pads of the bendable circuit sheet of the LED light strip of the LED tube lamp according to still another embodiment of the present invention.
Figure 15:
FIG. 15 is a plane view schematically illustrating a row of four soldering pads of the bendable circuit sheet of the LED light strip of the LED tube lamp according to yet another embodiment of the present invention.
Figure 16:
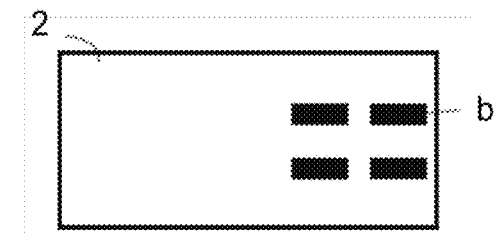
FIG. 16 is a plane view schematically illustrating two rows of two soldering pads of the bendable circuit sheet of the LED light strip of the LED tube lamp according to yet still another embodiment of the present invention.

Referring to FIG. 12, in one embodiment, the soldering pads "b" of the LED light strip 2 are two separate pads to electrically connect the positive and negative electrodes of the bendable circuit sheet of the LED light strip 2, respectively. The size of the soldering pads "b" may be, for example, about 3.5×2 mm$^2$. The printed circuit board of the power supply 5 is correspondingly provided with soldering pads "a" having reserved tin solders and the height of the tin solders suitable for subsequent automatic soldering bonding process is generally, for example, about 0.1 to 0.7 mm, in some embodiments 0.3 to 0.5 mm, and in some even more preferable embodiments about 0.4 mm. An electrically insulating through hole "c" may be formed between the two soldering pads "b" to isolate and prevent the two soldering pads from electrically short during soldering. Furthermore, an extra positioning opening "d" may also be provided behind the electrically insulating through hole "c" to allow an automatic soldering machine to quickly recognize the position of the soldering pads "b".

For the sake of achieving scalability and compatibility, the amount of the soldering pads "b" on each end of the LED light strip 2 may be more than one such as two, three, four, or more than four. When there is only one soldering pad "b" provided at each end of the LED light strip 2, the two ends of the LED light strip 2 are electrically connected to the power supply 5 to form a loop, and various electrical components can be used. For example, a capacitance may be replaced by an inductance to perform current regulation. Referring to FIGS. 13 to 16, when each end of the LED light strip 2 has three soldering pads, the third soldering pad can be grounded; when each end of the LED light strip 2 has four soldering pads, the fourth soldering pad can be used as a signal input terminal. Correspondingly, the power supply 5 can have the same amount of soldering pads "a" as that of the soldering pads "b" on the LED light strip 2. According to certain embodiments, as long as electrical short between the soldering pads "b" can be prevented, the soldering pads "b" can be arranged according to the dimension of the actual area for disposition, for example, three soldering pads can be arranged in a row or two rows. In other embodiments, the amount of the soldering pads "b" on the bendable circuit sheet of the LED light strip 2 may be reduced by rearranging the circuits on the bendable circuit sheet of the LED light strip 2. The lesser the amount of the soldering pads, the easier the fabrication process becomes. On the other hand, a greater number of soldering pads may improve and secure the electrically conductive between the LED light strip 2 and the output terminal of the power supply 5.

Referring to FIG. 17, in another embodiment, each soldering pad "b" is formed with a through hole "e" having a diameter generally of about 1 to 2 mm, in some embodiments of about 1.2 to 1.8 mm, and in yet some embodiments of about 1.5 mm. The through hole "e" communicates the soldering pad "a" with the soldering pad "b" so that the tin solder on the soldering pads "a" passes through the through holes "e" and finally reaches the soldering pads "b". Smaller through holes "e" would make it difficult for the tin solder to pass. The tin solder accumulates around the through holes "e" upon exiting the through holes "e" and condense to form a solder ball "g" with a larger diameter than that of the through holes "e" upon condensing. Such a solder ball "g" functions as a rivet to further increase the stability of the electrically conductive between the soldering pads "a" on the power supply 5 and the soldering pads "b" on the LED light strip 2.

Figure 18:
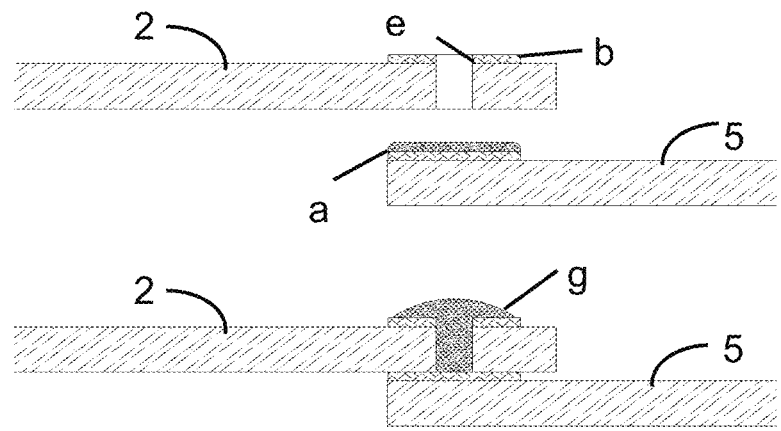
FIG. 18 is a plane cross-sectional view schematically illustrating soldering bonding process utilizing the soldering pads of the bendable circuit sheet of the LED light strip of FIG. 17 taken from side view and the printed circuit board of the power supply according to one embodiment of the present invention.
Figure 19:
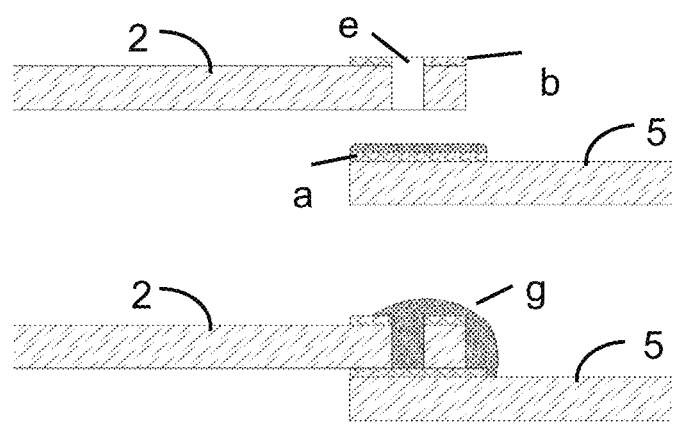
FIG. 19 is a plane cross-sectional view schematically illustrating soldering bonding process utilizing the soldering pads of the bendable circuit sheet of the LED light strip of FIG. 17 taken from a side view and the printed circuit board of the power supply according to another embodiment of the present invention, wherein the through hole of the soldering pads is near the edge of the bendable circuit sheet.
Figure 20:
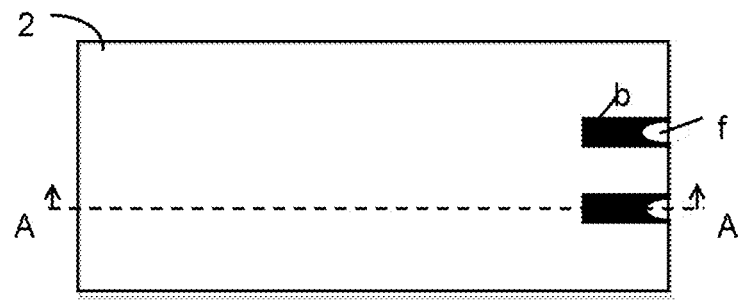
FIG. 20 is a plane view schematically illustrating notches formed on the soldering pads of the bendable circuit sheet of the LED light strip of the LED tube lamp according to one embodiment of the present invention.
Figure 21:
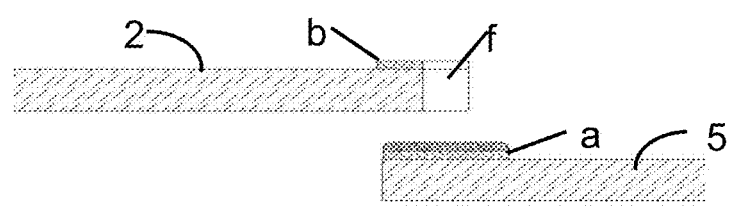
FIG. 21 is a plane cross-sectional view of FIG. 20 taken along a line A-A'.
Figure 21:
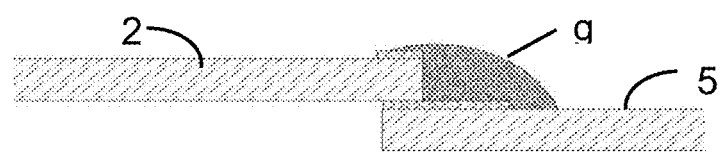

Referring to FIGS. 18 to 19, in other embodiments, when a distance from the through hole "e" to the side edge of the LED light strip 2 is less than 1 mm, the tin solder may pass through the through hole "e" to accumulate on the periphery of the through hole "e", and extra tin solder may spill over the soldering pads "b" to reflow along the side edge of the LED light strip 2 and join the tin solder on the soldering pads "a" of the power supply 5. The tin solder then condenses to form a structure like a rivet to firmly secure the LED light strip 2 onto the printed circuit board of the power supply 5 such that reliable electric connection is achieved. Referring to FIGS. 20 and 21, in another embodiment, the through hole "e" can be replaced by a notch "f" formed at the side edge of the soldering pads "b" for the tin solder to easily pass through the notch "f" and accumulate on the periphery of the notch "f" and to form a solder ball with a larger diameter than that of the notch "e" upon condensing. Such a solder ball may be formed like a C-shape rivet to enhance the secure capability of the electrically connecting structure.

Figure 22:
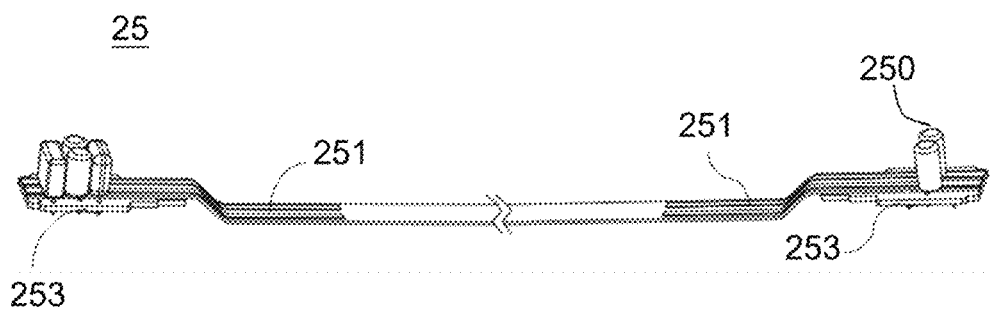
FIG. 22 is a perspective view schematically illustrating a circuit board assembly composed of the bendable circuit sheet of the LED light strip and the printed circuit board of the power supply according to another embodiment of the present invention.
Figure 23:
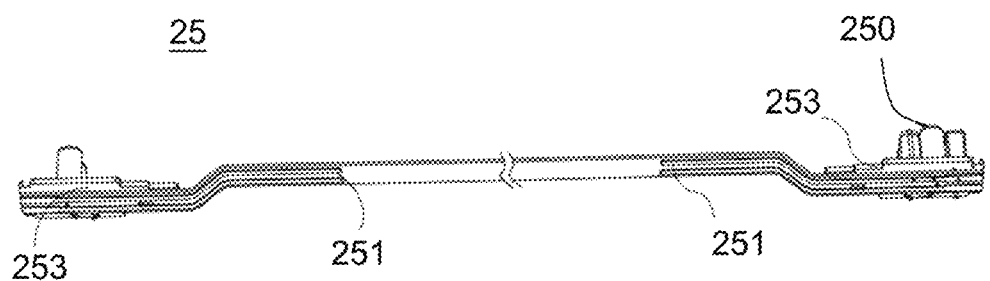
FIG. 23 is a perspective view schematically illustrating another arrangement of the circuit board assembly of FIG. 22.

Referring to FIGS. 22 and 23, in another embodiment, the LED light strip 2 and the power supply 5 may be connected by utilizing a circuit board assembly 25 instead of soldering bonding. The circuit board assembly 25 has a long circuit sheet 251 and a short circuit board 253 that are adhered to each other with the short circuit board 253 being adjacent to the side edge of the long circuit sheet 251. The short circuit board 253 may be provided with power supply module 250 to form the power supply 5. The short circuit board 253 is stiffer or more rigid than the long circuit sheet 251 to be able to support the power supply module 250.

The long circuit sheet 251 may be the bendable circuit sheet of the LED light strip including a metal layer 2a as shown in FIG. 10. The metal layer 2a of the long circuit sheet 251 and the power supply module 250 may be electrically connected in various manners depending on the demand in practice. As shown in FIG. 22, the power supply module 250 and the long circuit sheet 251 having the metal layer 2a on surface are on the same side of the short circuit board 253 such that the power supply module 250 is directly connected to the long circuit sheet 251. As shown in FIG. 23, alternatively, the power supply module 250 and the long circuit sheet 251 including the metal layer 2a on surface are on opposite sides of the short circuit board 253 such that the power supply module 250 is directly connected to the short circuit board 253 and indirectly connected to the a metal layer 2a of the LED light strip 2 by way of the short circuit board 253.

As shown in FIG. 22, in one embodiment, the long circuit sheet 251 and the short circuit board 253 are adhered together first, and the power supply module 250 is subsequently mounted on the metal layer 2a of the long circuit sheet 251 serving as the LED light strip 2. The long circuit sheet 251 of the LED light strip 2 herein is not limited to include only one metal layer 2a and may further include another metal layer such as the metal layer 2c shown in FIG. 48. The light sources 202 are disposed on the metal layer 2a of the LED light strip 2 and electrically connected to the power supply 5 by way of the metal layer 2a. As shown in FIG. 23, in another embodiment, the long circuit sheet 251 of the LED light strip 2 may include a metal layer 2a and a dielectric layer 2b. In one embodiment, the dielectric layer 2*b* may be adhered to the short circuit board 253 first and the metal layer 2*a* is subsequently adhered to the dielectric layer 2*b* and extends to the short circuit board 253. All these embodiments are within the scope of applying the circuit board assembly concept of the present disclosure.

In the above-mentioned embodiments, the short circuit board 253 may have a length generally of about 15 mm to about 40 mm and in some embodiments about 19 mm to about 36 mm, while the long circuit sheet 251 may have a length generally of about 800 mm to about 2800 mm and in some embodiments of about 1200 mm to about 2400 mm. A ratio of the length of the short circuit board 253 to the length of the long circuit sheet 251 ranges from, for example, about 1:20 to about 1:200.

When the ends of the LED light strip 2 are not fixed on the inner surface of the glass tube 1, the connection between the LED light strip 2 and the power supply 5 via soldering bonding could not firmly support the power supply 5, and it may be necessary to dispose the power supply 5 inside the end cap 3. For example, a longer end cap to have enough space for receiving the power supply 5 would be needed. However, this will reduce the length of the glass tube under the prerequisite that the total length of the LED tube lamp is fixed according to the product standard, and may therefore decrease the effective illuminating areas.

Next, examples of the circuit design and using of the power supply module 250 are described as follows.

Figure 28A:
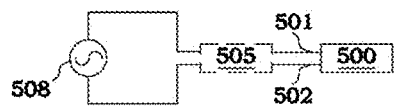
FIG. 28A is a block diagram of an exemplary power supply module 250 in an LED tube lamp according to some embodiments of the present invention.

FIG. 28A is a block diagram of a power supply system for an LED tube lamp according to an embodiment of the present invention. Referring to FIG. 28A, an AC power supply 508 is used to supply an AC supply signal, and may be an AC powerline with a voltage rating, for example, in 100-277 volts and a frequency rating, for example, of 50 or 60 Hz. A lamp driving circuit 505 receives and then converts the AC supply signal into an AC driving signal as an external driving signal. Lamp driving circuit 505 may be for example an electronic ballast used to convert the AC powerline into a high-frequency high-voltage AC driving signal. Common types of electronic ballast include instant-start ballast, program-start or rapid-start ballast, etc., which may all be applicable to the LED tube lamp of the present invention. The voltage of the AC driving signal is likely higher than 300 volts, and is in some embodiments in the range of about 400-700 volts. The frequency of the AC driving signal is likely higher than 10 k Hz, and is in some embodiments in the range of about 20 k-50 k Hz. The LED tube lamp 500 receives an external driving signal and is thus driven to emit light. In one embodiment, the external driving signal comprises the AC driving signal from lamp driving circuit 505. In one embodiment, LED tube lamp 500 is in a driving environment in which it is power-supplied at its one end cap having two conductive pins 501 and 502, which are coupled to lamp driving circuit 505 to receive the AC driving signal. The two conductive pins 501 and 502 may be electrically connected to, either directly or indirectly, the lamp driving circuit 505.

It is worth noting that lamp driving circuit 505 may be omitted and is therefore depicted by a dotted line. In one embodiment, if lamp driving circuit 505 is omitted, AC power supply 508 is directly connected to pins 501 and 502, which then receive the AC supply signal as an external driving signal.

Figure 28B:
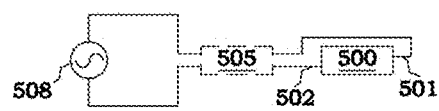
FIG. 28B is a block diagram of an exemplary power supply module 250 in an LED tube lamp according to some embodiments of the present invention.

In addition to the above use with a single-end power supply, LED tube lamp 500 may instead be used with a dual-end power supply to one pin at each of the two ends of an LED lamp tube. FIG. 28B is a block diagram of a power supply system for an LED tube lamp according to one embodiment of the present invention. Referring to FIG. 28B, compared to that shown in FIG. 28A, pins 501 and 502 are respectively disposed at the two opposite end caps of LED tube lamp 500, forming a single pin at each end of LED tube lamp 500, with other components and their functions being the same as those in FIG. 28A.

Figure 28C:
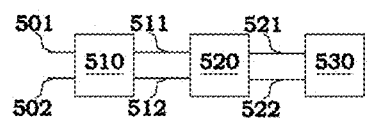
FIG. 28C is a block diagram of an exemplary LED lamp according to some embodiments of the present invention.

FIG. 28C is a block diagram of an LED lamp according to one embodiment of the present invention. Referring to FIG. 28C, the power supply module of the LED lamp summarily includes a rectifying circuit 510, and a filtering circuit 520. Rectifying circuit 510 is coupled to pins 501 and 502 to receive and then rectify an external driving signal, so as to output a rectified signal at output terminals 511 and 512. The external driving signal may be the AC driving signal or the AC supply signal described with reference to FIGS. 28A and 28B, or may even be a DC signal, which embodiments do not alter the LED lamp of the present invention. Filtering circuit 520 is coupled to the first rectifying circuit for filtering the rectified signal to produce a filtered signal, as recited in the claims. For instance, filtering circuit 520 is coupled to terminals 511 and 512 to receive and then filter the rectified signal, so as to output a filtered signal at output terminals 521 and 522. An LED lighting module 530 is coupled to filtering circuit 520, to receive the filtered signal for emitting light. For instance, LED lighting module 530 may be a circuit coupled to terminals 521 and 522 to receive the filtered signal and thereby to drive an LED unit (not shown) in LED lighting module 530 to emit light. Details of these operations are described in below descriptions of certain embodiments.

It is worth noting that although there are two output terminals 511 and 512 and two output terminals 521 and 522 in embodiments of these Figs., in practice the number of ports or terminals for coupling between rectifying circuit 510, filtering circuit 520, and LED lighting module 530 may be one or more depending on the needs of signal transmission between the circuits or devices.

In addition, the power supply module of the LED lamp described in FIG. 28C, and embodiments of the power supply module of an LED lamp described below, may each be used in the LED tube lamp 500 in FIGS. 28A and 28B, and may instead be used in any other type of LED lighting structure having two conductive pins used to conduct power, such as LED light bulbs, personal area lights (PAL), plug-in LED lamps with different types of bases (such as types of PL-S, PL-D, PL-T, PL-L, etc.), etc.

Figure 28D:
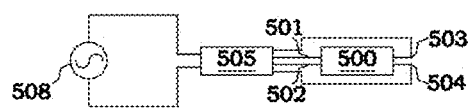
FIG. 28D is a block diagram of an exemplary power supply module 250 in an LED tube lamp according to some embodiments of the present invention.

FIG. 28D is a block diagram of a power supply system for an LED tube lamp according to an embodiment of the present invention. Referring to FIG. 28D, an AC power supply 508 is used to supply an AC supply signal. A lamp driving circuit 505 receives and then converts the AC supply signal into an AC driving signal. An LED tube lamp 500 receives an AC driving signal from lamp driving circuit 505 and is thus driven to emit light. In this embodiment, LED tube lamp 500 is power-supplied at its both end caps respectively having two pins 501 and 502 and two pins 503 and 504, which are coupled to lamp driving circuit 505 to concurrently receive the AC driving signal to drive an LED unit (not shown) in LED tube lamp 500 to emit light. AC power supply 508 may be e.g. the AC powerline, and lamp driving circuit 505 may be a stabilizer or an electronic ballast.

Figure 28E:
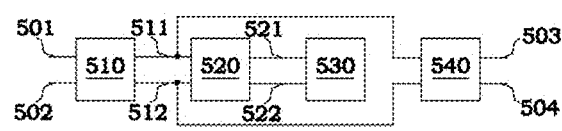
FIG. 28E is a block diagram of an LED lamp according to some embodiments of the present invention.

FIG. 28E is a block diagram of an LED lamp according to an embodiment of the present invention. Referring to FIG. 28E, the power supply module of the LED lamp, which as described above may be included in an end cap of the LED tube lamp, summarily includes a rectifying circuit 510, a filtering circuit 520, and a filtering circuit 540. Rectifying circuit 510 is coupled to pins 501 and 502 to receive and then rectify an external driving signal conducted by pins 501 and 502. Rectifying circuit 540 is coupled to pins 503 and 504 to receive and then rectify an external driving signal conducted by pins 503 and 504. Therefore, the power supply module of the LED lamp may include two rectifying circuits 510 and 540 configured to output a rectified signal at output terminals 511 and 512. Filtering circuit 520 is coupled to terminals 511 and 512 to receive and then filter the rectified signal, so as to output a filtered signal at output terminals 521 and 522. An LED lighting module 530 is coupled to terminals 521 and 522 to receive the filtered signal and thereby to drive an LED unit (not shown) in LED lighting module 530 to emit light.

The power supply module of the LED lamp in this embodiment of FIG. 28E may be used in LED tube lamp 500 with a dual-end power supply in FIG. 28D. Since the power supply module of the LED lamp comprises rectifying circuits 510 and 540, the power supply module of the LED lamp may be used in LED tube lamp 500 with a single-end power supply in FIGS. 28A and 28B, to receive an external driving signal (such as the AC supply signal or the AC driving signal described above). The power supply module of an LED lamp in this embodiment and other embodiments herein may also be used with a DC driving signal.

Figure 29A:
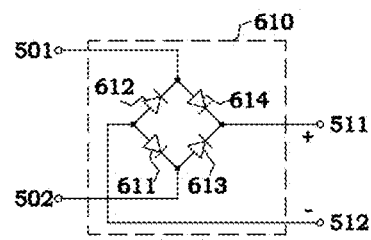
FIG. 29A is a schematic diagram of a rectifying circuit according to some embodiments of the present invention.

FIG. 29A is a schematic diagram of a rectifying circuit according to an embodiment of the present invention. Referring to FIG. 29A, rectifying circuit 610 includes rectifying diodes 611, 612, 613, and 614, configured to full-wave rectify a received signal. Diode 611 has an anode connected to output terminal 512, and a cathode connected to pin 502. Diode 612 has an anode connected to output terminal 512, and a cathode connected to pin 501. Diode 613 has an anode connected to pin 502, and a cathode connected to output terminal 511. Diode 614 has an anode connected to pin 501, and a cathode connected to output terminal 511.

When pins 501 and 502 receive an AC signal, rectifying circuit 610 operates as follows. During the connected AC signal's positive half cycle, the AC signal is input through pin 501, diode 614, and output terminal 511 in sequence, and later output through output terminal 512, diode 611, and pin 502 in sequence. During the connected AC signal's negative half cycle, the AC signal is input through pin 502, diode 613, and output terminal 511 in sequence, and later output through output terminal 512, diode 612, and pin 501 in sequence. Therefore, during the connected AC signal's full cycle, the positive pole of the rectified signal produced by rectifying circuit 610 remains at output terminal 511, and the negative pole of the rectified signal remains at output terminal 512. Accordingly, the rectified signal produced or output by rectifying circuit 610 is a full-wave rectified signal.

When pins 501 and 502 are coupled to a DC power supply to receive a DC signal, rectifying circuit 610 operates as follows. When pin 501 is coupled to the anode of the DC supply and pin 502 to the cathode of the DC supply, the DC signal is input through pin 501, diode 614, and output terminal 511 in sequence, and later output through output terminal 512, diode 611, and pin 502 in sequence. When pin 501 is coupled to the cathode of the DC supply and pin 502 to the anode of the DC supply, the DC signal is input through pin 502, diode 613, and output terminal 511 in sequence, and later output through output terminal 512, diode 612, and pin 501 in sequence. Therefore, no matter what the electrical polarity of the DC signal is between pins 501 and 502, the positive pole of the rectified signal produced by rectifying circuit 610 remains at output terminal 511, and the negative pole of the rectified signal remains at output terminal 512.

Therefore, rectifying circuit 610 in this embodiment can output or produce a proper rectified signal regardless of whether the received input signal is an AC or DC signal.

Figure 29B:
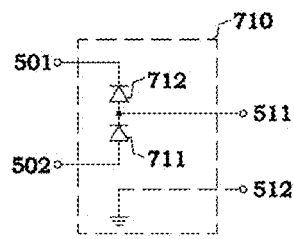
FIG. 29B is a schematic diagram of a rectifying circuit according to some embodiments of the present invention.

FIG. 29B is a schematic diagram of a rectifying circuit according to an embodiment of the present invention. Referring to FIG. 29B, rectifying circuit 710 includes rectifying diodes 711 and 712, configured to half-wave rectify a received signal. Diode 711 has an anode connected to pin 502, and a cathode connected to output terminal 511. Diode 712 has an anode connected to output terminal 511, and a cathode connected to pin 501. Output terminal 512 may be omitted or grounded depending on actual applications.

Next, exemplary operation(s) of rectifying circuit 710 is described as follows.

In one embodiment, during a received AC signal's positive half cycle, the electrical potential at pin 501 is higher than that at pin 502, so diodes 711 and 712 are both in a cutoff state as being reverse-biased, making rectifying circuit 710 not outputting a rectified signal. During a received AC signal's negative half cycle, the electrical potential at pin 501 is lower than that at pin 502, so diodes 711 and 712 are both in a conducting state as being forward-biased, allowing the AC signal to be input through diode 711 and output terminal 511, and later output through output terminal 512, a ground terminal, or another end of the LED tube lamp not directly connected to rectifying circuit 710. Accordingly, the rectified signal produced or output by rectifying circuit 710 is a half-wave rectified signal.

Figure 29C:
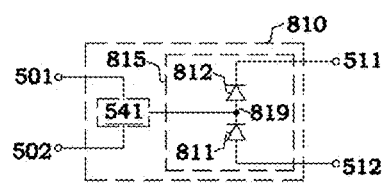
FIG. 29C is a schematic diagram of a rectifying circuit according to some embodiments of the present invention.

FIG. 29C is a schematic diagram of a rectifying circuit according to an embodiment of the present invention. Referring to FIG. 29C, rectifying circuit 810 includes a rectifying unit 815 and a terminal adapter circuit 541. In this embodiment, rectifying unit 815 comprises a half-wave rectifier circuit including diodes 811 and 812 and configured to half-wave rectify. Diode 811 has an anode connected to an output terminal 512, and a cathode connected to a half-wave node 819. Diode 812 has an anode connected to half-wave node 819, and a cathode connected to an output terminal 511. Terminal adapter circuit 541 is coupled to half-wave node 819 and pins 501 and 502, to transmit a signal received at pin 501 and/or pin 502 to half-wave node 819. By means of the terminal adapting function of terminal adapter circuit 541, rectifying circuit 810 allows of two input terminals (connected to pins 501 and 502) and two output terminals 511 and 512.

Next, in certain embodiments, rectifying circuit 810 operates as follows.

During a received AC signal's positive half cycle, the AC signal may be input through pin 501 or 502, terminal adapter circuit 541, half-wave node 819, diode 812, and output terminal 511 in sequence, and later output through another end or circuit of the LED tube lamp. During a received AC signal's negative half cycle, the AC signal may be input through another end or circuit of the LED tube lamp, and later output through output terminal 512, diode 811, half-wave node 819, terminal adapter circuit 541, and pin 501 or 502 in sequence.

In certain embodiments, terminal adapter circuit 541 may comprise a resistor, a capacitor, an inductor, or any combination thereof, for performing functions of voltage/current regulation or limiting, types of protection, current/voltage regulation, etc. Descriptions of these functions are presented below.

Figure 29D:
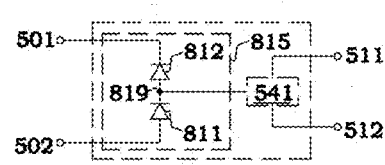
FIG. 29D is a schematic diagram of a rectifying circuit according to some embodiments of the present invention.

In practice, rectifying unit 815 and terminal adapter circuit 541 may be interchanged in position (as shown in FIG. 29D), without altering the function of half-wave rectification. FIG. 29D is a schematic diagram of a rectifying circuit according to one embodiment. Referring to FIG. 29D, diode 811 has an anode connected to pin 502 and diode 812 has a cathode connected to pin 501. A cathode of diode 811 and an anode of diode 812 are connected to half-wave node 819. Terminal adapter circuit 541 is coupled to half-wave node 819 and output terminals 511 and 512. During a received AC signal's positive half cycle, the AC signal may be input through another end or circuit of the LED tube lamp, and later output through output terminal 512 or 512, terminal adapter circuit 541, half-wave node 819, diode 812, and pin 501 in sequence. During a received AC signal's negative half cycle, the AC signal may be input through pin 502, diode 811, half-wave node 819, terminal adapter circuit 541, and output node 511 or 512 in sequence, and later output through another end or circuit of the LED tube lamp.

Terminal adapter circuit 541 in embodiments shown in FIGS. 29C and 29D may be omitted and is therefore depicted by a dotted line. If terminal adapter circuit 541 of FIG. 29C is omitted, pins 501 and 502 will be coupled to half-wave node 819. If terminal adapter circuit 541 of FIG. 29D is omitted, output terminals 511 and 512 will be coupled to half-wave node 819.

Rectifying circuit 510 as shown and explained in FIGS. 29A-D can constitute or be the rectifying circuit 540 shown in FIG. 28E, as having pins 503 and 504 for conducting instead of pins 501 and 502.

Next, an explanation follows as to choosing embodiments and their combinations of rectifying circuits 510 and 540, with reference to FIGS. 28C and 28E.

Rectifying circuit 510 in embodiments shown in FIG. 28C may comprise the rectifying circuit 610 in FIG. 29A.

Rectifying circuits 510 and 540 in embodiments shown in FIG. 28E may each comprise any one of the rectifying circuits in FIGS. 29A-D, and terminal adapter circuit 541 in FIGS. 29C-D may be omitted without altering the rectification function needed in an LED tube lamp. When rectifying circuits 510 and 540 each comprise a half-wave rectifier circuit described in FIGS. 29B-D, during a received AC signal's positive or negative half cycle, the AC signal may be input from one of rectifying circuits 510 and 540, and later output from the other rectifying circuit 510 or 540. Further, when rectifying circuits 510 and 540 each comprise the rectifying circuit described in FIG. 29C or 50D, or when they comprise the rectifying circuits in FIGS. 29C and 29D respectively, only one terminal adapter circuit 541 may be needed for functions of voltage/current regulation or limiting, types of protection, current/voltage regulation, etc. within rectifying circuits 510 and 540, omitting another terminal adapter circuit 541 within rectifying circuit 510 or 540.

Figure 30A:
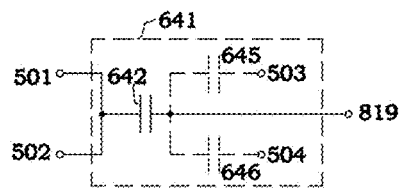
FIG. 30A is a schematic diagram of a terminal adapter circuit according to some embodiments of the present invention.

FIG. 30A is a schematic diagram of the terminal adapter circuit according to an embodiment of the present invention. Referring to FIG. 30A, terminal adapter circuit 641 comprises a capacitor 642 having an end connected to pins 501 and 502, and another end connected to half-wave node 819. Capacitor 642 has an equivalent impedance to an AC signal, which impedance increases as the frequency of the AC signal decreases, and decreases as the frequency increases. Therefore, capacitor 642 in terminal adapter circuit 641 in this embodiment works as a high-pass filter. Further, terminal adapter circuit 641 is connected in series to an LED unit in the LED tube lamp, producing an equivalent impedance of terminal adapter circuit 641 to perform a current/voltage limiting function on the LED unit, thereby preventing damaging of the LED unit by an excessive voltage across and/or current in the LED unit. In addition, choosing the value of capacitor 642 according to the frequency of the AC signal can further enhance voltage/current regulation.

Terminal adapter circuit 641 may further include a capacitor 645 and/or capacitor 646. Capacitor 645 has an end connected to half-wave node 819, and another end connected to pin 503. Capacitor 646 has an end connected to half-wave node 819, and another end connected to pin 504. For example, half-wave node 819 may be a common connective node between capacitors 645 and 646. And capacitor 642 acting as a current regulating capacitor is coupled to the common connective node and pins 501 and 502. In such a structure, series-connected capacitors 642 and 645 exist between one of pins 501 and 502 and pin 503, and/or series-connected capacitors 642 and 646 exist between one of pins 501 and 502 and pin 504. Through equivalent impedances of series-connected capacitors, voltages from the AC signal are divided. Referring to FIGS. 28E and 30A, according to ratios between equivalent impedances of the series-connected capacitors, the voltages respectively across capacitor 642 in rectifying circuit 510, filtering circuit 520, and LED lighting module 530 can be controlled, making the current flowing through an LED module in LED lighting module 530 being limited within a current rating, and then protecting/preventing filtering circuit 520 and LED lighting module 530 from being damaged by excessive voltages.

Figure 30B:
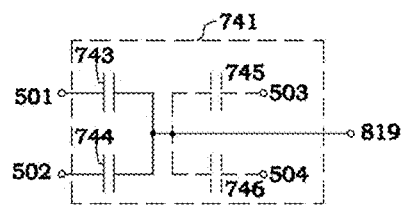
FIG. 30B is a schematic diagram of a terminal adapter circuit according to some embodiments of the present invention.

FIG. 30B is a schematic diagram of the terminal adapter circuit according to one embodiment. Referring to FIG. 30B, terminal adapter circuit 741 comprises capacitors 743 and 744. Capacitor 743 has an end connected to pin 501, and another end connected to half-wave node 819. Capacitor 744 has an end connected to pin 502, and another end connected to half-wave node 819. Compared to terminal adapter circuit 641 in FIG. 30A, terminal adapter circuit 741 has capacitors 743 and 744 in place of capacitor 642. Capacitance values of capacitors 743 and 744 may be the same as each other, or may differ from each other depending on the magnitudes of signals to be received at pins 501 and 502.

Similarly, terminal adapter circuit 741 may further comprise a capacitor 745 and/or a capacitor 746, respectively connected to pins 503 and 504. Thus, each of pins 501 and 502 and each of pins 503 and 504 may be connected in series to a capacitor, to achieve the functions of voltage division and other protections.

Figure 30C:
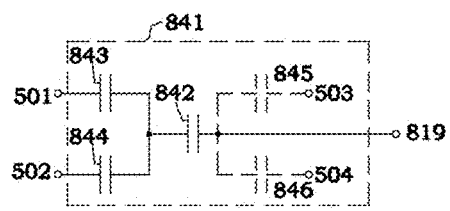
FIG. 30C is a schematic diagram of a terminal adapter circuit according to some embodiments of the present invention.

FIG. 30C is a schematic diagram of the terminal adapter circuit according to one embodiment. Referring to FIG. 30C, terminal adapter circuit 841 comprises capacitors 842, 843, and 844. Capacitors 842 and 843 are connected in series between pin 501 and half-wave node 819. Capacitors 842 and 844 are connected in series between pin 502 and half-wave node 819. In such a circuit structure, if any one of capacitors 842, 843, and 844 is shorted, there is still at least one capacitor (of the other two capacitors) between pin 501 and half-wave node 819 and between pin 502 and half-wave node 819, which performs a current-limiting function. Therefore, in the event that a user accidentally gets an electric shock, this circuit structure will prevent an excessive current flowing through and then seriously hurting the body of the user.

Similarly, terminal adapter circuit 841 may further comprise a capacitor 845 and/or a capacitor 846, respectively connected to pins 503 and 504. Thus, each of pins 501 and 502 and each of pins 503 and 504 may be connected in series to a capacitor, to achieve the functions of voltage division and other protections.

Figure 30D:
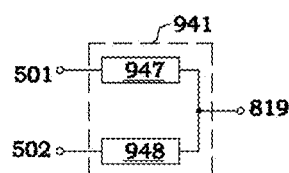
FIG. 30D is a schematic diagram of a terminal adapter circuit according to some embodiments of the present invention.

FIG. 30D is a schematic diagram of the terminal adapter circuit according to one embodiment. Referring to FIG.

30D, terminal adapter circuit 941 comprises fuses 947 and 948. Fuse 947 has an end connected to pin 501, and another end connected to half-wave node 819. Fuse 948 has an end connected to pin 502, and another end connected to half-wave node 819. With the fuses 947 and 948, when the current through each of pins 501 and 502 exceeds a current rating of a corresponding connected fuse 947 or 948, the corresponding fuse 947 or 948 will accordingly melt and then break the circuit to achieve overcurrent protection.

Each of the embodiments of the terminal adapter circuits as in rectifying circuits 510 and 810 coupled to pins 501 and 502 and shown and explained above can be used or included in the rectifying circuit 540 shown in FIG. 28E, as when conductive pins 503 and 504 and conductive pins 501 and 502 are interchanged in position.

Capacitance values of the capacitors in the embodiments of the terminal adapter circuits shown and described above are in some embodiments in the range, for example, of about 100 pF-100 nF. Also, a capacitor used in embodiments may be equivalently replaced by two or more capacitors connected in series or parallel. For example, each of capacitors 642 and 842 may be replaced by two series-connected capacitors, one having a capacitance value chosen from the range, for example of about 1.0 nF to about 2.5 nF and which may be in some embodiments preferably 1.5 nF, and the other having a capacitance value chosen from the range, for example of about 1.5 nF to about 3.0 nF, and which is in some embodiments about 2.2 nF.

Figure 31A:
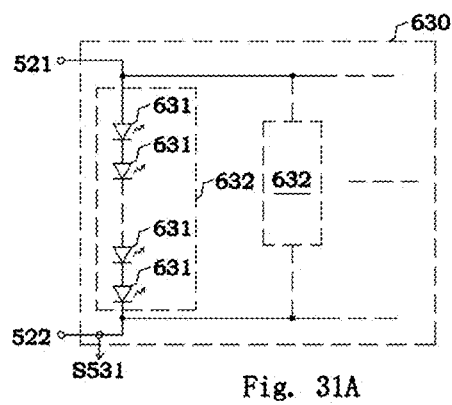
FIG. 31A is a schematic diagram of an LED module according to some embodiments of the present invention.

FIG. 31A is a schematic diagram of an LED module according to one embodiment. Referring to FIG. 31A, LED module 630 in the LED lighting module has an anode connected to the filtering output terminal 521, has a cathode connected to the filtering output terminal 522, and comprises at least one LED unit 632. When two or more LED units are included, they are connected in parallel. The anode of each LED unit 632 is connected to the anode of LED module 630 and thus output terminal 521, and the cathode of each LED unit 632 is connected to the cathode of LED module 630 and thus output terminal 522. Each LED unit 632 includes at least one LED 631. When multiple LEDs 631 are included in an LED unit 632, they are connected in series, with the anode of the first LED 631 connected to the anode of this LED unit 632, and the cathode of the first LED 631 connected to the next or second LED 631. And the anode of the last LED 631 in this LED unit 632 is connected to the cathode of a previous LED 631, with the cathode of the last LED 631 connected to the cathode of this LED unit 632.

LED module 630 may produce a current detection signal S531 reflecting a magnitude of current through LED module 630 and used for controlling or detecting on the LED module 630.

Figure 31B:
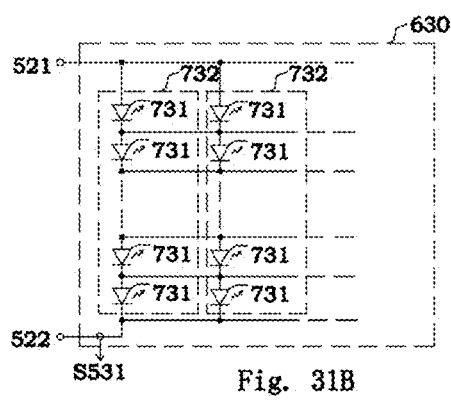
FIG. 31B is a schematic diagram of an LED module according to some embodiments of the present invention.

FIG. 31B is a schematic diagram of an LED module according to one embodiment. Referring to FIG. 31B, LED module 630 has an anode connected to the filtering output terminal 521, has a cathode connected to the filtering output terminal 522, and comprises at least two LED units 732, with the anode of each LED unit 732 connected to the anode of LED module 630, and the cathode of each LED unit 732 connected to the cathode of LED module 630. Each LED unit 732 includes at least two LEDs 731 connected in the same way as described in FIG. 31A. For example, the anode of the first LED 731 in an LED unit 732 is connected to the anode of this LED unit 732, the cathode of the first LED 731 is connected to the anode of the next or second LED 731, and the cathode of the last LED 731 is connected to the cathode of this LED unit 732. Further, LED units 732 in an LED module 630 are connected to each other in this embodiment. All of the n-th LEDs 731 respectively of the LED units 732 are connected by every anode of every n-th LED 731 in the LED units 732, and by every cathode of every n-th LED 731, where n is a positive integer. In this way, the LEDs in LED module 630 in this embodiment are connected in the form of a mesh.

In some examples, the LED lighting module 530 of the above embodiments includes LED module 630, but doesn't include a driving circuit for the LED module 630.

Similarly, LED module 630 in these examples may produce a current detection signal S531 reflecting a magnitude of current through LED module 630 and used for controlling or detecting on the LED module 630.

The number of LEDs 731 included by an LED unit 732 is in some embodiments in the range of 15-25, and is may be in some specific embodiments in the range of 18-22.

Figure 31C:
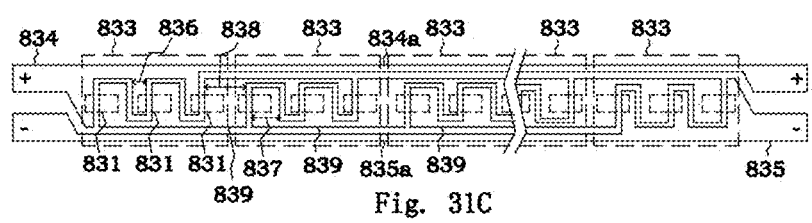
FIG. 31C is a plan view of a circuit layout of the LED module according to some embodiments of the present invention.

FIG. 31C is a plan view of a circuit layout of the LED module according to an embodiment of the present invention. Referring to FIG. 31C, in this embodiment LEDs 831 are connected in the same way as described in FIG. 31B, and three LED units are assumed in LED module 630 and described as follows for illustration. A positive conductive line 834 and a negative conductive line 835 are to receive a driving signal, for supplying power to the LEDs 831. For example, positive conductive line 834 may be coupled to the filtering output terminal 521 of the filtering circuit 520 described above, and negative conductive line 835 coupled to the filtering output terminal 522 of the filtering circuit 520, to receive a filtered signal. For the convenience of illustration, all three of the n-th LEDs 831 respectively of the three LED units are grouped as an LED set 833 in FIG. 31C.

Positive conductive line 834 connects the three first LEDs 831 respectively of the leftmost three LED units, at the anodes on the left sides of the three first LEDs 831 as shown in the leftmost LED set 833 of FIG. 31C. Negative conductive line 835 connects the three last LEDs 831 respectively of the leftmost three LED units, at the cathodes on the right sides of the three last LEDs 831 as shown in the rightmost LED set 833 of FIG. 31C. And of the three LED units, the cathodes of the three first LEDs 831, the anodes of the three last LEDs 831, and the anodes and cathodes of all the remaining LEDs 831 are connected by conductive lines or parts 839.

For example, the anodes of the three LEDs 831 in the first, leftmost LED set 833 may be connected together by positive conductive line 834, and their cathodes may be connected together by a leftmost conductive part 839. The anodes of the three LEDs 831 in the second, next-leftmost LED set 833 are also connected together by the leftmost conductive part 839, whereas their cathodes are connected together by a second, next-leftmost conductive part 839. Since the cathodes of the three LEDs 831 in the leftmost LED set 833 and the anodes of the three LEDs 831 in the second leftmost LED set 833 are connected together by the same leftmost conductive part 839, in each of the three LED units the cathode of the first LED 831 is connected to the anode of the next or second LED 831, with the remaining LEDs 831 also being connected in the same way. Accordingly, all the LEDs 831 of the three LED units are connected to form the mesh as shown in FIG. 31B.

In this embodiment the length 836 of a portion of each conductive part 839 that immediately connects to the anode of an LED 831 is smaller than the length 837 of another portion of each conductive part 839 that immediately connects to the cathode of an LED 831, making the area of the latter portion immediately connecting to the cathode larger than that of the former portion immediately connecting to the anode. The length 837 may be smaller than a length 838 of a portion of each conductive part 839 that immediately connects the cathode of an LED 831 and the anode of the next LED 831, making the area of the portion of each conductive part 839 that immediately connects a cathode and an anode larger than the area of any other portion of each conductive part 839 that immediately connects to only a cathode or an anode of an LED 831. Due to the length differences and area differences, this layout structure improves heat dissipation of the LEDs 831.

In some embodiments, positive conductive line 834 includes a lengthwise portion 834a, and negative conductive line 835 includes a lengthwise portion 835a, which are conducive to making the LED module have a positive "+" connective portion and a negative "−" connective portion at each of the two ends of the LED module, as shown in FIG. 31C. Such a layout structure allows for coupling any of other circuits of the power supply module of the LED lamp, including e.g. filtering circuit 520 and rectifying circuits 510 and 540, to the LED module through the positive connective portion and/or the negative connective portion at each or both ends of the LED lamp. Thus the layout structure increases the flexibility in arranging actual circuits in the LED lamp.

Figure 31D:
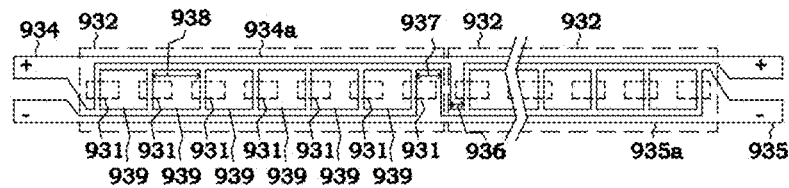
FIG. 31D is a plan view of a circuit layout of the LED module according to some embodiments of the present invention.

FIG. 31D is a plan view of a circuit layout of the LED module according to another embodiment. Referring to FIG. 31D, in this embodiment LEDs 931 are connected in the same way as described in FIG. 31A, and three LED units each including 7 LEDs 931 are assumed in LED module 630 and described as follows for illustration. A positive conductive line 934 and a negative conductive line 935 are to receive a driving signal, for supplying power to the LEDs 931. For example, positive conductive line 934 may be coupled to the filtering output terminal 521 of the filtering circuit 520 described above, and negative conductive line 935 coupled to the filtering output terminal 522 of the filtering circuit 520, to receive a filtered signal. For the convenience of illustration, all seven LEDs 931 of each of the three LED units are grouped as an LED set 932 in FIG. 31D. Thus there are three LED sets 932 corresponding to the three LED units.

Positive conductive line 934 connects to the anode on the left side of the first or leftmost LED 931 of each of the three LED sets 932. Negative conductive line 935 connects to the cathode on the right side of the last or rightmost LED 931 of each of the three LED sets 932. In each LED set 932, of two consecutive LEDs 931 the LED 931 on the left has a cathode connected by a conductive part 939 to an anode of the LED 931 on the right. By such a layout, the LEDs 931 of each LED set 932 are connected in series.

A conductive part 939 may be used to connect an anode and a cathode respectively of two consecutive LEDs 931. Negative conductive line 935 connects to the cathode of the last or rightmost LED 931 of each of the three LED sets 932. And positive conductive line 934 connects to the anode of the first or leftmost LED 931 of each of the three LED sets 932. Therefore, as shown in FIG. 31D, the length (and thus area) of the conductive part 939 is larger than that of the portion of negative conductive line 935 immediately connecting to a cathode, which length (and thus area) is then larger than that of the portion of positive conductive line 934 immediately connecting to an anode. For example, the length 938 of the conductive part 939 may be larger than the length 937 of the portion of negative conductive line 935 immediately connecting to a cathode of an LED 931, which length 937 is then larger than the length 936 of the portion of positive conductive line 934 immediately connecting to an anode of an LED 931. Such a layout structure improves heat dissipation of the LEDs 931 in LED module 630.

Positive conductive line 934 may include a lengthwise portion 934a, and negative conductive line 935 may include a lengthwise portion 935a, which are conducive to making the LED module have a positive "+" connective portion and a negative "−" connective portion at each of the two ends of the LED module, as shown in FIG. 31D. Such a layout structure allows for coupling any of other circuits of the power supply module of the LED lamp, including e.g. filtering circuit 520 and rectifying circuits 510 and 540, to the LED module through the positive connective portion 934a and/or the negative connective portion 935a at each or both ends of the LED lamp. Thus the layout structure increases the flexibility in arranging actual circuits in the LED lamp.

Further, the circuit layouts as shown in FIGS. 31C and 31D may be implemented with a bendable circuit sheet or substrate, which may be referred to as a flexible circuit board. For example, the bendable circuit sheet may comprise one conductive layer where positive conductive line 834, positive lengthwise portion 834a, negative conductive line 835, negative lengthwise portion 835a, and conductive parts 839 shown in FIG. 31C, and positive conductive line 934, positive lengthwise portion 934a, negative conductive line 935, negative lengthwise portion 935a, and conductive parts 939 shown in FIG. 31D are formed by the method of etching.

Figure 31E:
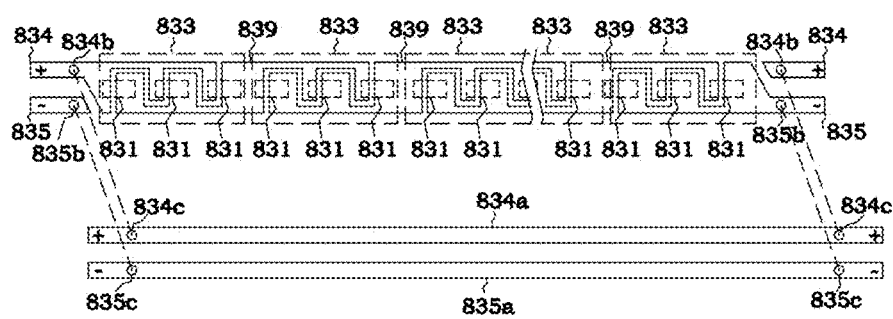
FIG. 31E is a plan view of a circuit layout of the LED module according to some embodiments of the present invention.

FIG. 31E is a plan view of a circuit layout of the LED module according to another embodiment. The layout structures of the LED module in FIGS. 31E and 31C each correspond to the same way of connecting LEDs 831 as that shown in FIG. 31B, but the layout structure in FIG. 31E comprises two conductive layers, instead of only one conductive layer for forming the circuit layout as shown in FIG. 31C. Referring to FIG. 31E, the main difference from the layout in FIG. 31C is that positive conductive line 834 and negative conductive line 835 have a lengthwise portion 834a and a lengthwise portion 835a, respectively, that are formed in a second conductive layer instead. The difference is elaborated as follows.

Referring to FIG. 31E, the bendable circuit sheet of the LED module comprises a first conductive layer 2a and a second conductive layer 2c electrically insulated from each other by a dielectric layer 2b (not shown). Of the two conductive layers, positive conductive line 834, negative conductive line 835, and conductive parts 839 in FIG. 31E are formed in first conductive layer 2a by the method of etching for electrically connecting the plurality of LED components 831 e.g. in a form of a mesh, whereas positive lengthwise portion 834a and negative lengthwise portion 835a are formed in second conductive layer 2c by etching for electrically connecting to (the filtering output terminal of) the filtering circuit. Further, positive conductive line 834 and negative conductive line 835 in first conductive layer 2a have via points 834b and via points 835b, respectively, for connecting to second conductive layer 2c. And positive lengthwise portion 834a and negative lengthwise portion 835a in second conductive layer 2c have via points 834c and via points 835c, respectively. Via points 834b are positioned corresponding to via points 834c, for connecting positive conductive line 834 and positive lengthwise portion 834a. Via points 835b are positioned corresponding to via points 835c, for connecting negative conductive line 835 and negative lengthwise portion 835a. A useful way of connecting the two conductive layers is to form a hole connecting each via point 834b and a corresponding via point 834c, and to form a hole connecting each via point 835b and a corresponding via point 835c, with the holes extending through the two conductive layers and the dielectric layer in-between. And positive conductive line 834 and positive lengthwise portion 834a can be electrically connected by welding metallic part(s) through the connecting hole(s), and negative conductive line 835 and negative lengthwise portion 835a can be electrically connected by welding metallic part(s) through the connecting hole(s).

Similarly, the layout structure of the LED module in FIG. 31D may alternatively have positive lengthwise portion 934a and negative lengthwise portion 935a disposed in a second conductive layer, to constitute a two-layer layout structure.

The thickness of the second conductive layer of a two-layer bendable circuit sheet is in some embodiments larger than that of the first conductive layer, in order to reduce the voltage drop or loss along each of the positive lengthwise portion and the negative lengthwise portion disposed in the second conductive layer. Compared to a one-layer bendable circuit sheet, since a positive lengthwise portion and a negative lengthwise portion are disposed in a second conductive layer in a two-layer bendable circuit sheet, the width (between two lengthwise sides) of the two-layer bendable circuit sheet is or can be reduced. On the same fixture or plate in a production process, the number of bendable circuit sheets each with a shorter width that can be laid together at most is larger than the number of bendable circuit sheets each with a longer width that can be laid together at most. Thus adopting a bendable circuit sheet with a shorter width can increase the efficiency of production of the LED module. And reliability in the production process, such as the accuracy of welding position when welding (materials on) the LED components, can also be improved, because a two-layer bendable circuit sheet can better maintain its shape.

As a variant of the above embodiments, a type of LED tube lamp is provided that has at least some of the electronic components of its power supply module disposed on a light strip of the LED tube lamp. For example, the technique of printed electronic circuit (PEC) can be used to print, insert, or embed at least some of the electronic components onto the light strip.

In one embodiment, all electronic components of the power supply module are disposed on the light strip. The production process may include or proceed with the following steps: preparation of the circuit substrate (e.g. preparation of a flexible printed circuit board); ink jet printing of metallic nano-ink; ink jet printing of active and passive components (as of the power supply module); drying/sintering; ink jet printing of interlayer bumps; spraying of insulating ink; ink jet printing of metallic nano-ink; ink jet printing of active and passive components (to sequentially form the included layers); spraying of surface bond pad(s); and spraying of solder resist against LED components.

In certain embodiments, if all electronic components of the power supply module are disposed on the light strip, electrical connection between terminal pins of the LED tube lamp and the light strip may be achieved by connecting the pins to conductive lines which are welded with ends of the light strip. In this case, another substrate for supporting the power supply module is not required, thereby allowing of an improved design or arrangement in the end cap(s) of the LED tube lamp. In some embodiments, components of the power supply module are disposed at two ends of the light strip, in order to significantly reduce the impact of heat generated from the power supply module's operations on the LED components. Since no substrate other than the light strip is used to support the power supply module in this case, the total amount of welding or soldering can be significantly reduced, improving the general reliability of the power supply module.

Another case is that some of all electronic components of the power supply module, such as some resistors and/or smaller size capacitors, are printed onto the light strip, and some bigger size components, such as some inductors and/or electrolytic capacitors, are disposed in the end cap(s). The production process of the light strip in this case may be the same as that described above. And in this case disposing some of all electronic components on the light strip is conducive to achieving a reasonable layout of the power supply module in the LED tube lamp, which may allow of an improved design in the end cap(s).

As a variant embodiment of the above, electronic components of the power supply module may be disposed on the light strip by a method of embedding or inserting, e.g. by embedding the components onto a bendable or flexible light strip. In some embodiments, this embedding may be realized by a method using copper-clad laminates (CCL) for forming a resistor or capacitor; a method using ink related to silk-screen printing; or a method of ink jet printing to embed passive components, wherein an ink jet printer is used to directly print inks to constitute passive components and related functionalities to intended positions on the light strip. Then through treatment by ultraviolet (UV) light or drying/sintering, the light strip is formed where passive components are embedded. The electronic components embedded onto the light strip include for example resistors, capacitors, and inductors. In other embodiments, active components also may be embedded. Through embedding some components onto the light strip, a reasonable layout of the power supply module can be achieved to allow of an improved design in the end cap(s), because the surface area on a printed circuit board used for carrying components of the power supply module is reduced or smaller, and as a result the size, weight, and thickness of the resulting printed circuit board for carrying components of the power supply module is also smaller or reduced. Also in this situation since welding points on the printed circuit board for welding resistors and/or capacitors if they were not to be disposed on the light strip are no longer used, the reliability of the power supply module is improved, in view of the fact that these welding points are most liable to (cause or incur) faults, malfunctions, or failures. Further, the length of conductive lines needed for connecting components on the printed circuit board is therefore also reduced, which allows of a more compact layout of components on the printed circuit board and thus improving the functionalities of these components.

Next, methods to produce embedded capacitors and resistors are explained as follows.

Usually, methods for manufacturing embedded capacitors employ or involve a concept called distributed or planar capacitance. The manufacturing process may include the following step(s). On a substrate of a copper layer a very thin insulation layer is applied or pressed, which is then generally disposed between a pair of layers including a power conductive layer and a ground layer. The very thin insulation layer makes the distance between the power conductive layer and the ground layer very short. A capacitance resulting from this structure can also be realized by a conventional technique of a plated-through hole. Basically, this step is used to create this structure comprising a big parallel-plate capacitor on a circuit substrate.

Of products of high electrical capacity, certain types of products employ distributed capacitances, and other types of products employ separate embedded capacitances. Through putting or adding a high dielectric-constant material such as barium titanate into the insulation layer, the high electrical capacity is achieved.

A usual method for manufacturing embedded resistors employ conductive or resistive adhesive. This may include, for example, a resin to which conductive carbon or graphite is added, which may be used as an additive or filler. The additive resin is silkscreen printed to an object location, and is then after treatment laminated inside the circuit board. The resulting resistor is connected to other electronic components through plated-through holes or microvias. Another method is called Ohmega-Ply, by which a two metallic layer structure of a copper layer and a thin nickel alloy layer constitutes a layer resistor relative to a substrate. Then through etching the copper layer and nickel alloy layer, different types of nickel alloy resistors with copper terminals can be formed. These types of resistor are each laminated inside the circuit board.

In an embodiment, conductive wires/lines are directly printed in a linear layout on an inner surface of the LED glass lamp tube, with LED components directly attached on the inner surface and electrically connected by the conductive wires. In some embodiments, the LED components in the form of chips are directly attached over the conductive wires on the inner surface, and connective points are at terminals of the wires for connecting the LED components and the power supply module. After being attached, the LED chips may have fluorescent powder applied or dropped thereon, for producing white light or light of other color by the operating LED tube lamp.

In some embodiments, luminous efficacy of the LED or LED component is 80 lm/W or above, and in some embodiments, it may be 120 lm/W or above. Certain more optimal embodiments may include a luminous efficacy of the LED or LED component of 160 lm/W or above. White light emitted by an LED component may be produced, for example, by mixing fluorescent powder with the monochromatic light emitted by a monochromatic LED chip. The white light in its spectrum has major wavelength ranges of 430-460 nm and 550-560 nm, or major wavelength ranges of 430-460 nm, 540-560 nm, and 620-640 nm.

Figure 32A:
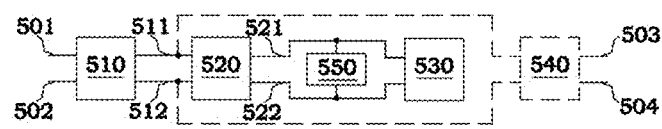
FIG. 32A is a block diagram of an exemplary power supply module in an LED lamp according to some embodiments of the present invention.

FIG. 32A is a block diagram of using a power supply module in an LED lamp according to one embodiment. The embodiment of FIG. 32A includes rectifying circuits 510 and 540, and a filtering circuit 520, and further includes an anti-flickering circuit 550 coupled between filtering circuit 520 and an LED lighting module 530. It's noted that rectifying circuit 540 may be omitted and is thus depicted in a dotted line in FIG. 32A.

Anti-flickering circuit 550 is coupled to filtering output terminals 521 and 522, to receive a filtered signal, and under specific circumstances to consume partial energy of the filtered signal so as to reduce (the incidence of) ripples of the filtered signal disrupting or interrupting the light emission of the LED lighting module 530. In general, filtering circuit 520 has such filtering components as resistor(s) and/or inductor(s), and/or parasitic capacitors and inductors, which may form resonant circuits. Upon breakoff or stop of an AC power signal, as when the power supply of the LED lamp is turned off by a user, the amplitude(s) of resonant signals in the resonant circuits will decrease with time. But LEDs in the LED module of the LED lamp are unidirectional conduction devices and require a minimum conduction voltage for the LED module. When a resonant signal's trough value is lower than the minimum conduction voltage of the LED module, but its peak value is still higher than the minimum conduction voltage, the flickering phenomenon will occur in light emission of the LED module. In this case anti-flickering circuit 550 works by allowing a current matching a defined flickering current value of the LED component to flow through, consuming partial energy of the filtered signal which should be higher than the energy difference of the resonant signal between its peak and trough values, so as to reduce the flickering phenomenon. In certain embodiments, a preferred occasion for anti-flickering circuit 550 to work is when the filtered signal's voltage approaches (and is still higher than) the minimum conduction voltage.

In some embodiments, anti-flickering circuit 550 may be more suitable for the situation in which LED lighting module 530 doesn't include a driving circuit, for example, when LED module 630 of LED lighting module 530 is directly driven to emit light by a filtered signal from a filtering circuit. In this case, the light emission of LED module 630 will directly reflect variation in the filtered signal due to its ripples. In this situation, the introduction of anti-flickering circuit 550 will help prevent the flickering phenomenon from occurring in the LED lamp upon the breakoff of power supply to the LED lamp.

Figure 32B:
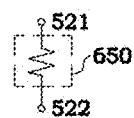
FIG. 32B is a schematic diagram of an anti-flickering circuit according to some embodiments of the present invention.

FIG. 32B is a schematic diagram of the anti-flickering circuit according to an embodiment of the present invention. Referring to FIG. 32B, anti-flickering circuit 650 includes at least a resistor, such as two resistors connected in series between filtering output terminals 521 and 522. In this embodiment, anti-flickering circuit 650 in use consumes partial energy of a filtered signal continually. When in normal operation of the LED lamp, this partial energy is far lower than the energy consumed by LED lighting module 530. But upon a breakoff or stop of the power supply, when the voltage level of the filtered signal decreases to approach the minimum conduction voltage of LED module 630, this partial energy is still consumed by anti-flickering circuit 650 in order to offset the impact of the resonant signals which may cause the flickering of light emission of LED module 630. In some embodiments, a current equal to or larger than an anti-flickering current level may be set to flow through anti-flickering circuit 650 when LED module 630 is supplied by the minimum conduction voltage, and then an equivalent anti-flickering resistance of anti-flickering circuit 650 can be determined based on the set current.

Figure 33A:
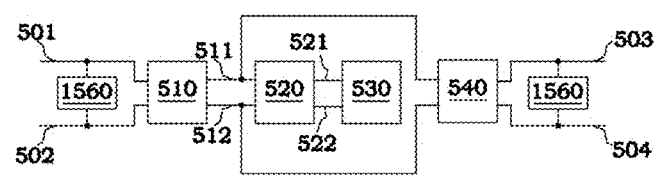
FIG. 33A is a block diagram of an exemplary power supply module in an LED tube lamp according to some embodiments of the present invention.

FIG. 33A is a block diagram including a power supply module for an LED tube lamp according to an embodiment of the present invention. Compared to that shown in FIG. 28E, the present embodiment comprises the rectifying circuits 510 and 540, the filtering circuit 520, and the LED lighting module 530, and further comprises two filament-simulating circuits 1560. The filament-simulating circuits 1560 are respectively coupled between the pins 501 and 502 and coupled between the pins 503 and 504, for improving a compatibility with a lamp driving circuit having filament detection function, e.g.: program-start ballast.

In an initial stage upon the lamp driving circuit having filament detection function being activated, the lamp driving circuit will determine whether the filaments of the lamp operate normally or are in an abnormal condition of short-circuit or open-circuit. When determining the abnormal condition of the filaments, the lamp driving circuit stops operating and enters a protection state. In order to avoid that the lamp driving circuit erroneously determines the LED tube lamp to be abnormal due to the LED tube lamp having no filament, the two filament-simulating circuits 1560 simulate the operation of actual filaments of a fluorescent tube to have the lamp driving circuit enter into a normal state to start the LED lamp normally.

Figure 33B:
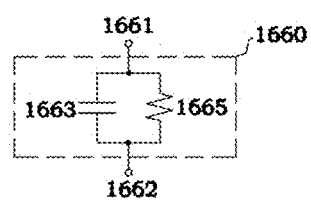
FIG. 33B is a schematic diagram of a filament-simulating circuit according to some embodiments of the present invention.

FIG. 33B is a schematic diagram of a filament-simulating circuit according to one embodiment. The filament-simulating circuit comprises a capacitor 1663 and a resistor 1665 connected in parallel, and two ends of the capacitor 1663 and two ends of the resistor 1665 are re respectively coupled to filament simulating terminals 1661 and 1662. Referring to FIG. 33A, the filament simulating terminals 1661 and 1662 of the two filament simulating 1660 are respectively coupled to the pins 501 and 502 and the pins 503 and 504. During the filament detection process, the lamp driving circuit outputs a detection signal to detect the state of the filaments. The detection signal passes the capacitor 1663 and the resistor 1665 and so the lamp driving circuit determines that the filaments of the LED lamp are normal.

In addition, a capacitance value of the capacitor 1663 is low and so a capacitive reactance (equivalent impedance) of the capacitor 1663 is far lower than an impedance of the resistor 1665 due to the lamp driving circuit outputting a high-frequency alternative current (AC) signal to drive LED lamp. Therefore, the filament-simulating circuit 1660 consumes fairly low power when the LED lamp operates normally, and so it almost does not affect the luminous efficiency of the LED lamp.

Figure 33C:
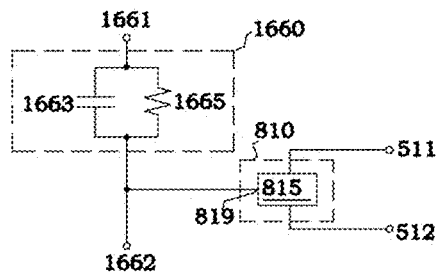
FIG. 33C is a schematic block diagram including a filament-simulating circuit according to some embodiments of the present invention.

FIG. 33C is a schematic block diagram including a filament-simulating circuit according to one embodiment. In the present embodiment, the filament-simulating circuit 1660 replaces the terminal adapter circuit 541 of the rectifying circuit 810 shown in FIG. 29C, which is adopted as the rectifying circuit 510 or/and 540 in the LED lamp. For example, the filament-simulating circuit 1660 of the present embodiment has both of filament simulating and terminal adapting functions. Referring to FIG. 33A, the filament simulating terminals 1661 and 1662 of the filament-simulating circuit 1660 are respectively coupled to the pins 501 and 502 or/and pins 503 and 504. The half-wave node 819 of rectifying unit 815 in the rectifying circuit 810 is coupled to the filament simulating terminal 1662.

Figure 33D:
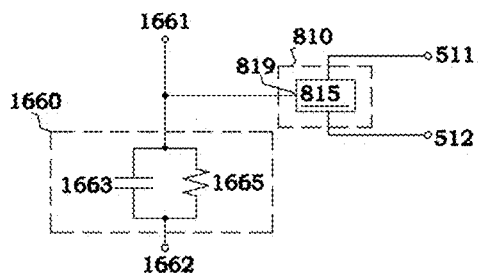
FIG. 33D is a schematic block diagram including a filament-simulating circuit according to some embodiments of the present invention.

FIG. 33D is a schematic block diagram including a filament-simulating circuit according to another embodiment. Compared to that shown in FIG. 33C, the half-wave node is changed to be coupled to the filament simulating terminal 1661, and the filament-simulating circuit 1660 in the present embodiment still has both of filament simulating and terminal adapting functions.

Figure 33E:
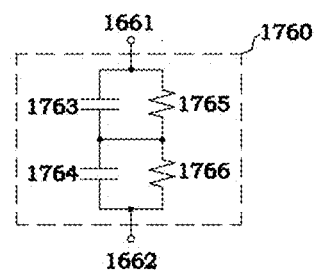
FIG. 33E is a schematic diagram of a filament-simulating circuit according to some embodiments of the present invention.

FIG. 33E is a schematic diagram of a filament-simulating circuit according to another embodiment. A filament-simulating circuit 1760 comprises capacitors 1763 and 1764, and the resistors 1765 and 1766. The capacitors 1763 and 1764 are connected in series and coupled between the filament simulating terminals 1661 and 1662. The resistors 1765 and 1766 are connected in series and coupled between the filament simulating terminals 1661 and 1662. Furthermore, the connection node of capacitors 1763 and 1764 is coupled to that of the resistors 1765 and 1766. Referring to FIG. 33A, the filament simulating terminals 1661 and 1662 of the filament-simulating circuit 1760 are respectively coupled to the pins 501 and 502 and the pins 503 and 504. When the lamp driving circuit outputs the detection signal for detecting the state of the filament, the detection signal passes the capacitors 1763 and 1764 and the resistors 1765 and 1766 so that the lamp driving circuit determines that the filaments of the LED lamp are normal.

In some embodiments, capacitance values of the capacitors 1763 and 1764 are low and so a capacitive reactance of the serially connected capacitors 1763 and 1764 is far lower than an impedance of the serially connected resistors 1765 and 1766 due to the lamp driving circuit outputting the high-frequency AC signal to drive the LED lamp. Therefore, the filament-simulating circuit 1760 consumes fairly low power when the LED lamp operates normally, and so it almost does not affect the luminous efficiency of the LED lamp. Moreover, any one of the capacitor 1763 and the resistor 1765 is short circuited or is an open circuit, or any one of the capacitor 1764 and the resistor 1766 is short circuited or is an open circuit, the detection signal still passes through the filament-simulating circuit 1760 between the filament simulating terminals 1661 and 1662. Therefore, the filament-simulating circuit 1760 still operates normally when any one of the capacitor 1763 and the resistor 1765 is short circuited or is an open circuit or any one of the capacitor 1764 and the resistor 1766 is short circuited or is an open circuit, and so it has quite high fault tolerance.

Figure 33F:
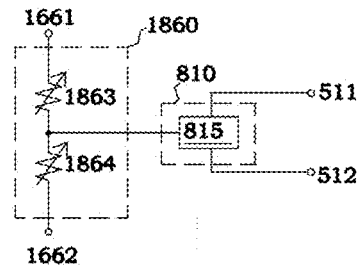
FIG. 33F is a schematic block diagram including a filament-simulating circuit according to some embodiments of the present invention.

FIG. 33F is a schematic block diagram including a filament-simulating circuit according to one embodiment. In the present embodiment, the filament-simulating circuit 1860 replaces the terminal adapter circuit 541 of the rectifying circuit 810 shown in FIG. 29C, which is adopted as the rectifying circuit 510 or/and 540 in the LED lamp. For example, the filament-simulating circuit 1860 of the present embodiment has both of filament simulating and terminal adapting functions. An impedance of the filament-simulating circuit 1860 has a negative temperature coefficient (NTC), i.e., the impedance at a higher temperature is lower than that at a lower temperature. In the present embodiment, the filament-simulating circuit 1860 comprises two NTC resistors 1863 and 1864 connected in series and coupled to the filament simulating terminals 1661 and 1662. Referring to FIG. 33A, the filament simulating terminals 1661 and 1662 are respectively coupled to the pins 501 and 502 or/and the pins 503 and 504. The half-wave node 819 of the rectifying unit 815 in the rectifying circuit 810 is coupled to a connection node of the NTC resistors 1863 and 1864.

When the lamp driving circuit outputs the detection signal for detecting the state of the filament, the detection signal passes the NTC resistors 1863 and 1864 so that the lamp driving circuit determines that the filaments of the LED lamp are normal. The impedance of the serially connected NTC resistors 1863 and 1864 is gradually decreased with the gradually increasing of temperature due to the detection signal or a preheat process. When the lamp driving circuit enters into the normal state to start the LED lamp normally, the impedance of the serially connected NTC resistors 1863 and 1864 is decreased to a relative low value and so the power consumption of the filament simulation circuit 1860 is lower.

An exemplary impedance of the filament-simulating circuit 1860 can be 10 ohms or more at room temperature (25 degrees Celsius) and may be decreased to a range of about 2-10 ohms when the lamp driving circuit enters into the normal state. It may be preferred that the impedance of the filament-simulating circuit 1860 is decreased to a range of about 3-6 ohms when the lamp driving circuit enters into the normal state.

Figure 34A:
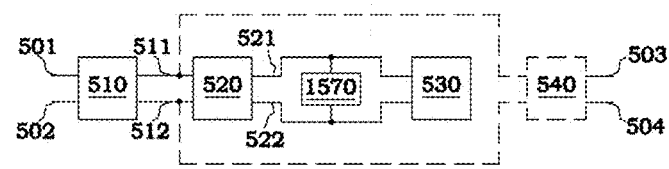
FIG. 34A is a block diagram of an exemplary power supply module in an LED tube lamp according to some embodiments of the present invention.

FIG. 34A is a block diagram including a power supply module for an LED tube lamp according to one embodiment. Compared to that shown in FIG. 28E, the present embodiment comprises the rectifying circuits 510 and 540, the filtering circuit 520, and the LED lighting module 530, and further comprises an over voltage protection (OVP) circuit 1570. The OVP circuit 1570 is coupled to the filtering output terminals 521 and 522 for detecting the filtered signal. The OVP circuit 1570 clamps the level of the filtered signal when determining the level thereof higher than a defined, particular OVP value. Hence, the OVP circuit 1570 protects the LED lighting module 530 from damage due to an OVP condition. The rectifying circuit 540 may be omitted and is therefore depicted by a dotted line.

Figure 34B:
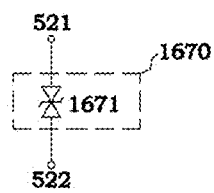
FIG. 34B is a schematic diagram of an over-voltage protection (OVP) circuit according to an embodiment of the present invention.

FIG. 34B is a schematic diagram of an overvoltage protection (OVP) circuit according to one embodiment. The OVP circuit 1670 comprises a voltage clamping diode 1671, such as zener diode, coupled to the filtering output terminals 521 and 522. The voltage clamping diode 1671 is conducted to clamp a voltage difference at a breakdown voltage when the voltage difference of the filtering output terminals 521 and 522 (i.e., the level of the filtered signal) reaches the breakdown voltage. The breakdown voltage may be preferred in a range of about 40 V to about 100 V, and more preferred in a range of about 55 V to about 75V. Referring to FIG. 24, in one embodiment, each of the LED light sources 202 may be provided with a LED lead frame 202b having a recess 202a, and an LED chip 18 disposed in the recess 202a. The recess 202a may be one or more than one in amount. The recess 202a may be filled with phosphor covering the LED chip 18 to convert emitted light therefrom into a desired light color. Compared with a conventional LED chip being a substantial square, the LED chip 18 in this embodiment is in some embodiments rectangular with the dimension of the length side to the width side at a ratio ranges generally from about 2:1 to about 10:1, in some embodiments from about 2.5:1 to about 5:1, and in some more desirable embodiments from 3:1 to 4.5:1. Moreover, the LED chip 18 is in some embodiments arranged with its length direction extending along the length direction of the glass tube 1 to increase the average current density of the LED chip 18 and improve the overall illumination field shape of the glass tube 1. The glass tube 1 may have a number of LED light sources 202 arranged into one or more rows, and each row of the LED light sources 202 is arranged along the length direction (Y-direction) of the glass tube 1.

Referring again to FIG. 24, the recess 202a is enclosed by two parallel first sidewalls 15 and two parallel second sidewalls 16 with the first sidewalls 15 being lower than the second sidewalls 16. The two first sidewalls 15 are arranged to be located along a length direction (Y-direction) of the glass tube 1 and extend along the width direction (X-direction) of the glass tube 1, and two second sidewalls 16 are arranged to be located along a width direction (X-direction) of the glass tube 1 and extend along the length direction (Y-direction) of the glass tube 1. The extending direction of the first sidewalls 15 may be substantially or exactly parallel to the width direction (X-direction) of the glass tube 1, and the first sidewalls may have various outlines such as zigzag, curved, wavy, and the like. Similarly, the extending direction of the second sidewalls 16 may be substantially or exactly parallel to the length direction (Y-direction) of the glass tube 1, and the second sidewalls may have various outlines such as zigzag, curved, wavy, and the like. In one row of the LED light sources 202, the arrangement of the first sidewalls 15 and the second sidewalls 16 for each LED light source 202 can be the same or different.

Having the first sidewalls 15 being lower than the second sidewalls 16 and proper distance arrangement, the LED lead frame 202b allows dispersion of the light illumination to cross over the LED lead frame 202b without causing uncomfortable visual feeling to people observing the LED tube lamp along the Y-direction. The first sidewalls 15 may to be lower than the second sidewalls, however, and in this case each rows of the LED light sources 202 are more closely arranged to reduce grainy effects. On the other hand, when a user of the LED tube lamp observes the glass tube thereof along the X-direction, the second sidewalls 16 also can block user's line of sight from seeing the LED light sources 202, and which reduces unpleasing grainy effects.

Referring again to FIG. 24, the first sidewalls 15 each includes an inner surface 15a facing toward outside of the recess 202a. The inner surface 15a may be designed to be an inclined plane such that the light illumination easily crosses over the first sidewalls 15 and spreads out. The inclined plane of the inner surface 15a may be flat or cambered or combined shape. In some embodiments, when the inclined plane is flat, the slope of the inner surface 15a ranges from about 30 degrees to about 60 degrees. Thus, an included angle between the bottom surface of the recess 202a and the inner surface 15a may range from about 120 to about 150 degrees. In some embodiments, the slope of the inner surface 15a ranges from about 15 degrees to about 75 degrees, and the included angle between the bottom surface of the recess 202a and the inner surface 15a ranges from about 105 degrees to about 165 degrees.

There may be one row or several rows of the LED light sources 202 arranged in a length direction (Y-direction) of the glass tube 1. In case of one row, in one embodiment the second sidewalls 16 of the LED lead frames 202b of all of the LED light sources 202 located in the same row are disposed in same straight lines to respectively from two walls for blocking user's line of sight seeing the LED light sources 202. In case of several rows, in one embodiment only the LED lead frames 202b of the LED light sources 202 disposed in the outermost two rows are disposed in same straight lines to respectively form walls for blocking user's line of sight seeing the LED light sources 202. The LED lead frames 202b of the LED light sources 202 disposed in the other rows can have different arrangements. For example, as far as the LED light sources 202 located in the middle row (third row) are concerned, the LED lead frames 202b thereof may be arranged such that: each LED lead frame 202b has the first sidewalls 15 arranged along the length direction (Y-direction) of the glass tube 1 with the second sidewalls 16 arranged along in the width direction (X-direction) of the glass tube 1; each LED lead frame 202b has the first sidewalls 15 arranged along the width direction (X-direction) of the glass tube 1 with the second sidewalls 16 arranged along the length direction (Y-direction) of the glass tube 1; or the LED lead frames 202b are arranged in a staggered manner. To reduce grainy effects caused by the LED light sources 202 when a user of the LED tube lamp observes the glass tube thereof along the X-direction, it may be enough to have the second sidewalls 16 of the LED lead frames 202b of the LED light sources 202 located in the outmost rows to block user's line of sight from seeing the LED light sources 202. Different arrangements may be used for the second sidewalls 16 of the LED lead frames 202b of one or several of the LED light sources 202 located in the outmost two rows.

In summary, when a plurality of the LED light sources 202 are arranged in a row extending along the length direction of the glass tube 1, the second sidewalls 16 of the LED lead frames 202b of all of the LED light sources 202 located in the same row may be disposed in same straight lines to respectively form walls for blocking user's line of sight seeing the LED light sources 202. When a plurality of the LED light sources 202 are arranged in a number of rows being located along the width direction of the glass tube 1 and extending along the length direction of the glass tube 1, the second sidewalls 16 of the LED lead frames 202b of all of the LED light sources 202 located in the outmost two rows may be disposed in straight lines to respectively from two walls for blocking user's line of sight seeing the LED light sources 202. The one or more than one rows located between the outmost rows may have the first sidewalls 15 and the second sidewalls 16 arranged in a way the same as or different from that for the outmost rows.

Figure 27:
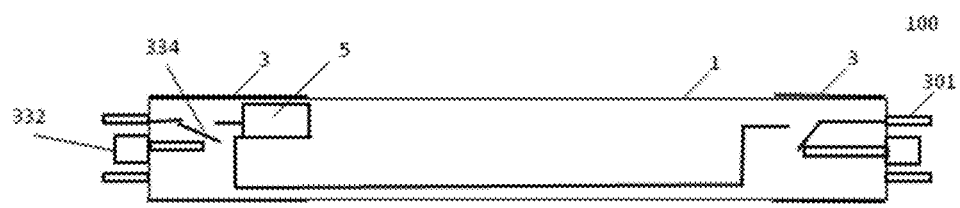
FIG. 27 is a plane view schematically illustrating a LED tube lamp with end caps having safety switches according to one embodiment of the present invention.

Turing to FIG. 27, in accordance with an exemplary embodiment, the end cap 3 includes a housing, an electrically conductive pin 301, a power supply 5 and a safety switch. The safety switch is positioned between the electrically conductive pin 301 and the power supply 5. The safety switch may further include a micro switch 334 and an actuator 332. The end caps 3 are disposed on two ends of the glass tube 1 and are configured to turn on the safety switch—and make a circuit connecting, sequentially, main electricity coming from a socket of a lamp holder, the electrically conductive pin 301, the power supply 5 and the LED light assembly—when the electrically conductive pin 301 is plugged into the socket. The end cap 3 is configured to turn off the safety switch and open the circuit when the electrically conductive pin 301 is unplugged from the socket of the lamp holder. The glass tube 1 is thus configured to minimize risk of electric shocks during installation and to comply with safety regulations.

In some embodiments, the safety switch directly—and mechanically—completes and breaks the circuit of the LED tube lamp. In other embodiments, the safe switch controls another electrical circuit, i.e. a relay, which in turn completes and breaks the circuit of the LED tube lamp. Some relays use an electromagnet to operate a switching mechanism mechanically, but other operating principles are also used. For example, solid-state relays control power circuits with no moving parts, instead using a semiconductor device to perform switching.

As shown in FIG. 27, the proportion of the end cap 3 in relation to the glass tube 1 is exaggerated in order to highlight the structure of the end cap 3. In an embodiment, the depth of the end cap 3 is from 9 to 70 mm. The axial length of the glass tube 1 is from 254 to 2000 mm, i.e. from 1 inch to 8 inch.

The safety switch may be two in number and disposed respectively inside two end caps. In an embodiment, a first end cap of the lamp tube includes a safety switch but a second end cap does not, and a warning is attached to the first end cap to alert an operator to plug in the second end cap before moving on to the first end cap.

In an embodiment, the safety switch may be a level switch including liquid. Only when liquid inside the level switch is made to flow to a designated place, the level switch is turned on. The end cap 3 is configured to turn on the level switch and, directly or through a relay, complete or close the circuit only when the electrically conductive pin 301 is plugged into the socket. Alternatively, a micro switch is triggered by an actuator when the electrically conductive pin is plugged into the socket and the actuator is pressed. The end cap 3 is configured to, likewise, turn on the micro switch and, directly or through a relay, close the circuit only when the electrically conductive pin 301 is plugged into the socket.

Figure 26A:
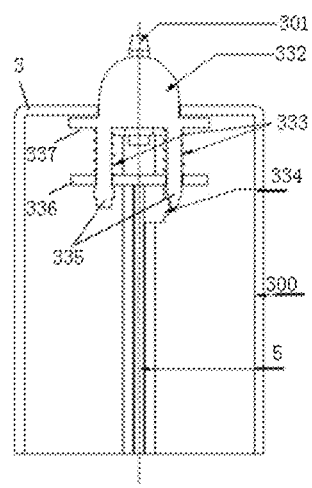
FIGS. 26A to 26F are views schematically illustrating various end caps having safety switches according to embodiments of the present invention.

Turning to FIG. 26A, in accordance with an exemplary embodiment, the end cap 3 includes a housing 300, an electrically conductive pin 301 disposed on top wall of the housing 300, an actuator 332 movably disposed on the housing 300 along the direction of the electrically conductive pin 301, and a micro switch 334. The upper portion of the actuator 332 projects out of an opening formed in the top wall of the housing 300. The actuator 332 includes, for example, inside the housing 300, a stopping flange 337 extending radially at the actuator's intermediary portion and a shaft 335 extending axially at the actuator's lower portion. The shaft 335 is movably connected to a base 336 rigidly mounted inside the housing 300. A preloaded coil spring 333 is retained, around the shaft 335, between the stopping flange 337 and the base 336. An aperture is provided in the upper portion of the actuator 332 through which the electrically conductive pin 301 is arranged. The micro switch 334 is positioned inside the housing 300 to be actuated by the shaft 335 at a predetermined actuation point. The micro switch 334, when actuated (e.g., when moved in a direction away from the top wall of the housing 300, closes the circuit, directly or through a relay, between the electrically conductive pin 301 and the power supply 5. The actuator 332 is aligned with the electrically conductive pin 301, the opening in the top wall of the housing 300, and the coil spring 333 along the longitudinal axis of the glass tube 1, to be reciprocally movable between the top wall of the housing 300 and the base 336. When the electrically conductive pin 301 is unplugged from the socket of a lamp holder, the coil spring 333 and stopping flange 337 biases (e.g., moves) the actuator 332 to its rest position. The micro switch 334 then stays off and the circuit of the LED tube lamp stays open. When the electrically conductive pin 301 is duly plugged into the socket, the actuator 332 is depressed and brings the shaft 335 to the actuation point. The micro switch 334 is turned on to, directly or through a relay, complete the circuit of the LED tube lamp.

Figure 26B:
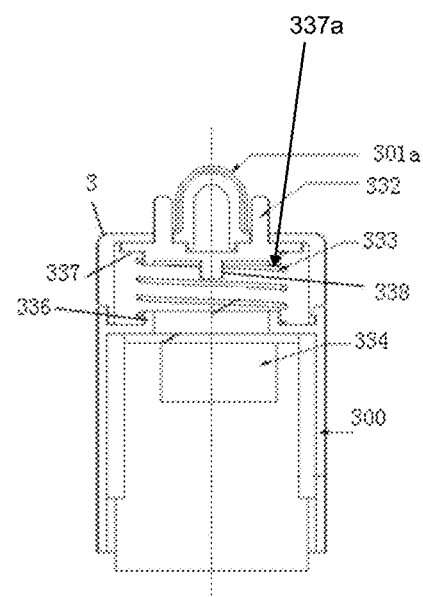

Turning to FIG. 26B, in accordance with an exemplary embodiment, the end cap 3 includes a housing 300, an electrically conductive pin 301a disposed on top wall of the housing 300, an actuator 332 movably disposed on the housing 300 along the direction of the electrically conductive pin 301a, and a micro switch 334. In one embodiment, the electrically conductive pin 301a is an enlarged hollow structure. The upper portion of the actuator 332 is bowl-shaped to receive the electrically conductive pin 301a and projects out of an opening formed in the top wall of the housing 300. The actuator 332 includes, inside the housing 300, a stopping flange 337 extending radially at the actuator's intermediary portion and, at the actuator's lower portion, a spring retainer 337a and a bulging part 338 (also referred to as a protruding portion or a protrusion, protruding from a bottom of the actuator 332 or a spring retainer 337a of the actuator 332). A preloaded coil spring 333 is retained between the string retainer and a base 336 rigidly mounted inside the housing 300. The micro switch 334 is positioned inside the housing 300 to be actuated by the bulging part 338 at a predetermined actuation point. The micro switch 334, when actuated, completes the circuit, directly or through a relay, between the electrically conductive pin 301a and the power supply. The actuator 332 is aligned with the electrically conductive pin 301a, the opening in the top wall of the housing 300 and the coil spring 333 along the longitudinal axis of the lamp tube 1 to be reciprocally movable between the top wall of the housing 300 and the base 336. When the electrically conductive pin 301a is unplugged from the socket of a lamp holder, the coil spring 333 and the stopping flange 337 biases the actuator 332 to its rest position. The micro switch 334 stays off and the circuit of the LED tube lamp 1 stays open. When the electrically conductive pin 301a is duly plugged into the socket of the lamp holder, the actuator 332 is depressed and brings the bulging part 338 to the actuation point. The micro switch 334 is turned on to, directly or through a relay, complete the circuit.

Figure 26C:
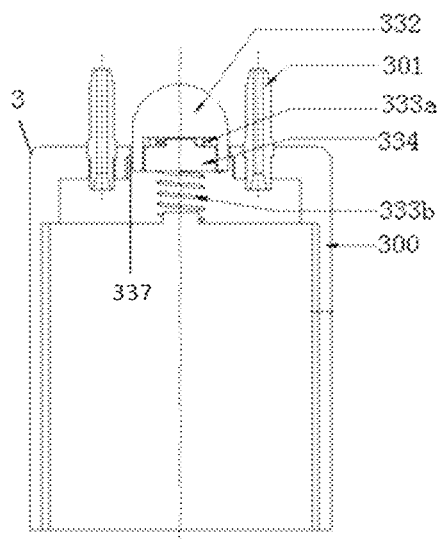

Turning to FIG. 26C, in accordance with an exemplary embodiment, the end cap 3 includes a housing 300, a power supply (not shown), an electrically conductive pin 301 disposed on top wall of the housing 300, an actuator 332 movably disposed on the housing 300 along the direction of the electrically conductive pin 301, and a micro switch 334. In one embodiment, the end cap includes a pair of electrically conductive pins 301. The upper portion of the actuator 332 projects out of an opening formed in the top wall of the housing 300. The actuator 332 includes, inside the housing 300, a stopping flange 337 extending radially at the actuator's intermediary portion and a spring retainer at the actuator's lower portion. A first coil spring 333a, preloaded, is retained between a spring retainer and a first end of the micro switch 334. A second coil spring 333b, also preloaded, is retained between a second end of the micro switch 334 and a base rigidly mounted inside the housing. Both of the springs 333a, 333b are chosen to respond to a gentle depression; however, in certain embodiments, the first coil spring 333a is chosen to have a different stiffness than the second coil spring 333b. For example, in one embodiment, the first coil spring 333a reacts to a depression of from 0.5 to 1 N but the second coil spring 333b reacts to a depression of from 3 to 4 N (e.g., the second coil spring 333b may be stiffer than the first coil spring 333a, and may require a force of 3 to 8 times the force used to move the first coil spring 333a). The actuator 332 is aligned with the opening in the top wall of the housing 300, the micro switch 334, and the set of coil springs 333a, 333b along the longitudinal axis of the lamp tube, to be reciprocally movable between the top wall of the housing 300 and the base. The micro switch 334, sandwiched between the first coil spring 333a and the second coil spring 333b, is actuated when the first coil spring 333a is compressed to a predetermined actuation point. The micro switch 334, when actuated, completes the circuit, directly or through a relay, between the pair of electrically conductive pins 301 and the power supply. When the pair of electrically conductive pins 301 are unplugged from the socket of a lamp holder, the pair of coil springs 333a, 333b and the stopping flange 337 bias the actuator 332 to its rest position. The micro switch 334 stays off and the circuit of the LED tube lamp stays open. When the pair of electrically conductive pins 301 are duly plugged into the socket of a lamp holder, the actuator 332 is depressed and compresses the first coil spring 333a to the actuation point. The micro switch 334 is turned on to, directly or through a relay, complete the circuit.

Figure 26D:
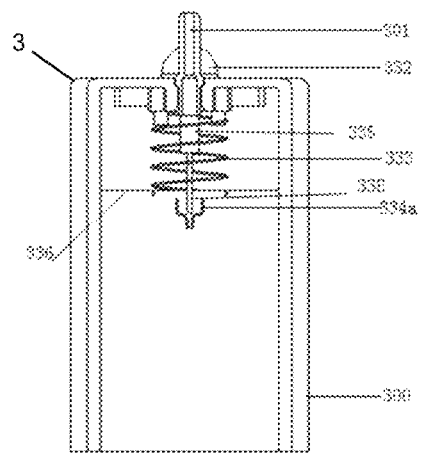

Turning to FIG. 26D, in accordance with an exemplary embodiment, the end cap 3 includes a housing 300, a power supply (not shown), an electrically conductive pin 301 disposed on top wall of the housing 300, an actuator 332 movably disposed on the housing 300 along the direction of the electrically conductive pin 301, a first contact element 334a and a second contact element 338. The upper portion of the actuator 332 projects out of an opening formed in the top wall of the housing 300. The actuator 332 includes, inside the housing 300, a stopping flange extending radially at the actuator's intermediary portion and a shaft 335 extending axially at the actuator's lower portion. The shaft 335 is movably connected to a base 336 rigidly mounted inside the housing 300. A preloaded coil spring 333 is retained, around the shaft 335, between the stopping flange and the base 336. An aperture is provided in the upper portion of the actuator 332 through which the electrically conductive pin 301 is arranged. The actuator 332 is aligned with the electrically conductive pin 301, the opening in the top wall of the housing 300, the coil spring 333 and the first and second contact elements 334a, 338 along the longitudinal axis of the lamp tube to be reciprocally movable between the top wall of the housing 300 and the base 336. The first contact element 334a includes a plurality of metallic pieces, which are spaced apart from one another, and is configured to form a flexible female-type receptacle, e.g. V-shaped or bell-shaped. The second contact element 338 is positioned on the shaft 335 to, when the shaft 335 moves downwards, come into the first contact element 334a and electrically connect the plurality of metallic pieces at a predetermined actuation point. The first contact element 334a is configured to impart a spring-like bias on the second contact element 338 when the second contact element 338 goes into the first contact element 334a to ensure faithful electrical conduction between the two. The first and second contact elements 334a, 338 are made from, for example, copper alloy. When the electrically conductive pin 301 is unplugged from the socket of a lamp holder, the coil spring 333 and the stopping flange biases the actuator 332 to its rest position. The first and second contact elements 334a, 338 stay unconnected and the circuit of the LED tube lamp stays open. When the electrically conductive pin 301 is duly plugged into the socket of a lamp holder, the actuator 332 is depressed and brings the second contact element 338 to the actuation point. The first and second contact elements 334a, 338 are connected to, directly or through a relay, complete the circuit of the LED tube lamp. The contact element 334a may be made of copper.

Figure 26E:
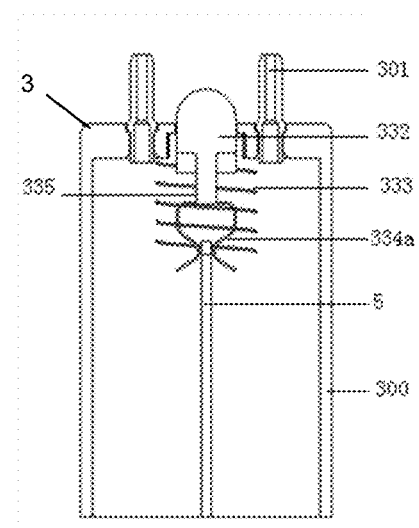

Turning to FIG. 26E, in accordance with an exemplary embodiment, the end cap 3 includes a housing 300, a power supply 5, an electrically conductive pin 301 disposed on top wall of the housing 300, an actuator 332 movably disposed on the housing 300 along the direction of the electrically conductive pin 301, a first contact element 334a and a second contact element. The upper portion of the actuator 332 projects out of an opening formed in the top wall of the housing 300. The actuator 332 includes, inside the housing 300, a stopping flange (not shown) extending radially at the actuator's intermediary portion and a shaft 335 extending axially at the actuator's lower portion. The shaft 335 is movably connected to a base (not shown) rigidly mounted inside the housing 300. A preloaded coil spring 333 is retained, around the shaft 335, between the stopping flange and the base. The actuator 332 is aligned with the opening in the top wall of the housing 300, the coil spring 333, the first contact element 334a and the second contact element along the longitudinal axis of the lamp tube to be reciprocally movable between the top wall of the housing 300 and the base. The first contact element 334a forms an integral and flexible female-type receptacle and may be made, for example from a metal such as copper and/or copper alloy. The second contact element, made from, for example, copper and/or copper alloy, is fixedly disposed inside the housing 300. In an embodiment, the second contact element is fixedly disposed on the power supply 5. The first contact element 334a is attached to the lower end of the shaft 335 to, when the shaft 335 moves downwards, receive and electrically connect the second contact element at a predetermined actuation point. The first contact element 334a is configured to impart a spring-like bias on the second contact element when the former receives the latter to ensure faithful electrically conductive with each other. When the electrically conductive pin 301 is unplugged from the socket of a lamp holder, the coil spring 333 and the stopping flange biases the actuator 332 to its rest position. The first contact element 334a and the second contact element stay unconnected and the circuit of the LED tube lamp stays open. When the electrically conductive pin 301 is duly plugged into the socket of a lamp holder, the actuator 332 is depressed and brings the first contact element 334a to the actuation point. The first contact element 334a and the second contact element are connected to, directly or through a relay, complete the circuit of the LED tube lamp.

Figure 26F:
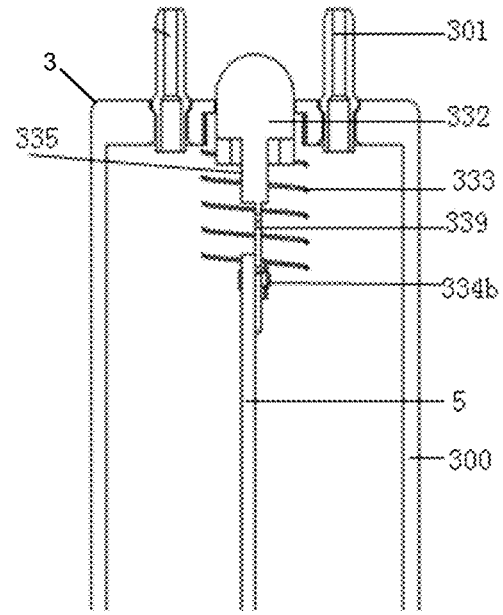

Turning to FIG. 26F, in accordance with an exemplary embodiment of the claimed invention, the end cap 3 includes a housing 300, a power supply 5, an electrically conductive pin 301 disposed on top wall of the housing 300, an actuator 332 movably disposed on the housing 300 along the direction of the electrically conductive pin 301, a first contact element 334b and a second contact element. The upper portion of the actuator 332 projects out of an opening formed in the top wall of the housing 300. The actuator 332 includes, inside the housing 300, a stopping flange (not shown) extending radially at the actuator's intermediary portion and a shaft 335 extending axially at the actuator's lower portion. The shaft 335 is movably connected to a base rigidly mounted inside the housing 300. A preloaded coil spring 333 is retained, around the shaft 335, between the stopping flange and the base. The actuator 332 is aligned with the opening in the top wall of the housing 300, the coil spring 333, the first contact element 334b, and the second contact element along the longitudinal axis of the lamp tube, to be reciprocally movable between the top wall of the housing 300 and the base. In one embodiment, the shaft 335 includes a non-electrically conductive body in the shape of an elongated thin plank and a window 339 carved out from the body. The first contact element 334b and the second contact element are fixedly disposed inside the housing 300 and face each other through the shaft 335. The first contact element 334b is configured to impart a spring-like bias on the shaft 335 and to push the shaft 335 against the second contact element. In one embodiment, the first contact element 334b is a bow-shaped laminate bending towards the shaft 335 and the second contact element, which is disposed on the power supply 5. The first contact element 334b and the second contact element are made from, for example, copper and/or copper alloy. When the actuator 332 is in its rest position, the first contact element 334b and the second contact element are prevented by the body of the shaft 335 from engaging each other. However, the first contact element 334b is configured to, when the shaft brings its window 339 downwards to a predetermined actuation point, engage and electrically connect the second contact element through the window 339. When the electrically conductive pin 301 is unplugged from the socket, the coil spring 333 and the stopping flange biases the actuator 332 to its rest position. The first contact element 334b and the second contact element stay unconnected and the circuit of the LED tube lamp stays open. When the electrically conductive pin 301 is duly plugged into the socket of a lamp holder, the actuator 332 is depressed and brings the window 339 to the actuation point. The first contact element 334b engages the second contact element to, directly or through a relay, complete the circuit of the LED tube lamp.

In an embodiment, the upper portion of the actuator 332 that projects out of the housing 300 has a shorter length than the electrically conductive pin 301. In some embodiments, the projected portion of the actuator 332 has a length of from 20 to 95% of that of the electrically conductive pin 301.

The various systems shown in FIGS. 26A through 26F that allow an actuator to move toward and extend away from a LED tube and a housing of the end cap may be referred to herein as expansion means. An expandable component, such as actuator at an end of the housing of the end cap, can be used to change an overall length of at least part of the LED tube lamp (e.g., a part extending along a central radial axis of the LED tube lamp). Also, though a coil spring is specifically described above, other types of springs or devices that function as a spring can be used.

The LED tube lamps according to various different embodiments are described as above. With respect to an entire LED tube lamp, the features including "securing the glass tube and the end cap with a highly thermal conductive silicone gel", "covering the glass tube with a heat shrink sleeve", "adopting the bendable circuit sheet as the LED light strip", "the bendable circuit sheet being a metal layer structure or a double layer structure of a metal layer and a dielectric layer", "coating the adhesive film on the inner surface of the glass tube", "coating the diffusion film on the inner surface of the glass tube", "covering the diffusion film in form of a sheet above the LED light sources", "coating the reflective film on the inner surface of the glass tube", "the end cap including the thermal conductive member", "the end cap including the magnetic metal member", "the LED light source being provided with the lead frame", "utilizing the circuit board assembly to connect the LED light strip and the power supply", "the rectifying circuit", "the terminal adapter circuit", "the anti-flickering circuit", "the protection circuit" and "the filament-simulating circuit" may be applied in practice singly or integrally such that only one of the features is practiced or a number of the features are simultaneously practiced.

Furthermore, any of the features "adopting the bendable circuit sheet as the LED light strip", "the bendable circuit sheet being a metal layer structure or a double layer structure of a metal layer and a dielectric layer" which concerns the "securing the glass tube and the end cap with a highly thermal conductive silicone gel" includes any related technical points and their variations and any combination thereof as described in the above-mentioned embodiments of the present invention, and which concerns the "covering the glass tube with a heat shrink sleeve" includes any related technical points and their variations and any combination thereof as described in the above-mentioned embodiments. "coating the adhesive film on the inner surface of the glass tube", "coating the diffusion film on the inner surface of the glass tube", "covering the diffusion film in form of a sheet above the LED light sources", "coating the reflective film on the inner surface of the glass tube", "the LED light source being provided with the lead frame", and "utilizing the circuit board assembly to connect the LED light strip and the power supply" includes any related technical points and their variations and any combination thereof as described in the abovementioned embodiments.

As an example, the feature "adopting the bendable circuit sheet as the LED light strip" may include "the connection between the bendable circuit sheet and the power supply is by way of wire bonding or soldering bonding; the bendable circuit sheet being a metal layer structure or a double layer structure of a metal layer and a dielectric layer; the bendable circuit sheet has a circuit protective layer made of ink to reflect lights and has widened part along the circumferential direction of the glass tube to function as a reflective film."

As an example, the feature "coating the diffusion film on the inner surface of the glass tube" may include "the composition of the diffusion film includes calcium carbonate, halogen calcium phosphate and aluminum oxide, or any combination thereof," and may further include "thickener and a ceramic activated carbon; the diffusion film may be a sheet covering the LED light source."

As an example, the feature "coating the reflective film on the inner surface of the glass tube" may include "the LED light sources are disposed above the reflective film, within an opening in the reflective film or beside the reflective film."

As an example, the feature "the LED light source being provided with the lead frame" may include "the lead frame has a recess for receive an LED chip, the recess is enclosed by first sidewalls and second sidewalls with the first sidewalls being lower than the second sidewalls, wherein the first sidewalls are arranged to locate along a length direction of the glass tube while the second sidewalls are arranged to locate along a width direction of the glass tube."

As an example, the feature "utilizing the circuit board assembly to connect the LED light strip and the power supply" may include "the circuit board assembly has a long circuit sheet and a short circuit board that are adhered to each other with the short circuit board being adjacent to the side edge of the long circuit sheet; the short circuit board is provided with a power supply module to form the power supply; the short circuit board is stiffer than the long circuit sheet."

According to the disclosed embodiments of the rectifying circuit in the power supply module, there may be a signal rectifying circuit, or dual rectifying circuit. First and second rectifying circuits of the dual rectifying circuit are respectively coupled to the two end caps disposed on two ends of the LED tube lamp. The single rectifying circuit is applicable to the drive architecture of signal-end power supply, and the dual rectifying circuit is applicable to the drive architecture of dual-end power supply. Furthermore, the LED tube lamp having at least one rectifying circuit is applicable to the drive architecture of low frequency AC signal, high frequency AC signal or DC signal.

The single rectifying circuit may be a half-wave rectifier circuit or full-wave rectifying circuit. The dual rectifying circuit may comprise two half-wave rectifier circuits, two full-wave rectifying circuits or one half-wave rectifier circuit and one full-wave rectifying circuit.

According to the disclosed embodiments of the pin in the power supply module, there may be two pins in single end (the other end has no pin), two pins in corresponding end of two ends, or four pins in corresponding end of two ends. The embodiments of two pins in single end two pins in corresponding end of two ends are applicable to signal rectifying circuit design of the of the rectifying circuit. The embodiments of four pins in corresponding end of two ends is applicable to dual rectifying circuit design of the of the rectifying circuit, and the external driving signal can be received by two pins in only one end or in two ends.

According to the disclosed embodiments of the filtering circuit of the power supply module, there may be a single capacitor, or π filter circuit. The filtering circuit filters the high frequency component of the rectified signal for providing a DC signal with a low ripple voltage as the filtered signal. The filtering circuit may also further comprise the LC filtering circuit having a high impedance for a specific frequency for conforming to current limitations in specific frequencies of the UL standard. Moreover, the filtering circuit according to some embodiments further comprises a filtering unit coupled between a rectifying circuit and the pin(s) for reducing the EMI.

A protection circuit may be additionally added to protect the LED module. The protection circuit detects the current and/or the voltage of the LED module to determine whether to enable corresponding over current and/or over voltage protection.

According to the disclosed embodiments of the filament-simulating circuit of the power supply module, there may be a single set of a parallel-connected capacitor and resistor, two serially connected sets, each having a parallel-connected capacitor and resistor, or a negative temperature coefficient circuit. The filament-simulating circuit is applicable to program-start ballast for avoiding the program-start ballast determining the filament abnormally, and so the compatibility of the LED tube lamp with program-start ballast is enhanced. Furthermore, the filament-simulating circuit almost does not affect the compatibilities for other ballasts, e.g., instant-start and rapid-start ballasts.

The above-mentioned features of the present disclosure can be accomplished in any combination to improve the LED tube lamp, and the above embodiments are described by way of example only. The present invention is not herein limited, and many variations are possible without departing from the spirit of the present invention and the scope as defined in the appended claims.

What is claimed is:

1. An LED tube lamp, comprising:
a glass tube;
two end caps disposed at two ends of the glass tube, at least one of the end caps having a main body, an actuator configured to move toward and extend away from the glass tube, a micro switch and an electrically conductive pin, wherein the actuator includes a flange extending radially at an intermediary portion of the actuator and wherein the micro switch is configured to be triggered by the actuator being pressed when the electrically conductive pin receives an external driving signal;
a power supply module, disposed in at least one end cap and coupled to the electrically conductive pins of the two end caps; and
an LED light strip disposed inside the glass tube with at least one LED light source that is mounted on the LED light strip and electrically connected with the power supply module through the LED light strip;
wherein, the glass tube includes a diffusion film to allow the light emitted from the least one light source of the LED tube lamp to pass through the diffusion film and the glass tube surface in sequence; and the micro switch when triggered completes a circuit between the electrically conductive pin and the power supply module.

2. The LED tube lamp of claim 1, wherein the diffusion film is in the form of a coating layer covering the inner surface of the glass tube.

3. The LED tube lamp of claim 1, wherein the diffusion film is in the form of a coating layer covering a surface of the least one light source inside the glass tube.

4. The LED tube lamp of claim 1, wherein the diffusion film is in the form of an optical diffusion coating, which is composed of any one of calcium carbonate, halogen calcium phosphate strontium phosphate, and aluminum oxide, or any combination thereof.

5. The LED tube lamp of claim 1, wherein the diffusion film is in the form of a sheet covering the least one light source without touching the light sources.

6. The LED tube lamp of claim 5, wherein the sheet is a composite made of mixing diffusion particles into polystyrene (PS), polymethyl methacrylate (PMMA), polyethylene terephthalate (PET), and/or polycarbonate (PC), or any combination thereof.

7. The LED tube lamp of claim 5, wherein the glass tube and the end caps are secured by a thermal conductive silicone gel, and the thermal conductivity of the thermal conductive silicone gel is higher than 0.7 w/mk.

8. The LED tube lamp of claim 1, wherein the glass tube is covered by a heat shrink sleeve.

9. The LED tube lamp of claim 1, wherein a thickness of the heat shrink sleeve is an amount in the range of 20 μm to 200 μm.

10. The LED tube lamp of claim 1, wherein a thickness of the diffusion film is an amount in the range of 20 μm to 30 μm.

11. The LED tube lamp of claim 1, wherein the diffusion film has a light transmittance of between 92% to 94% with a thickness between 200 μm and 300 μm.

12. The LED tube lamp of claim 1, wherein the glass tube further includes a reflective film disposed on part of the inner circumferential surface of the glass tube.

13. The LED tube lamp of claim 12, wherein a ratio of a length of the reflective film disposed on the inner surface of the glass tube extending along the circumferential direction of the glass tube to a circumferential length of the glass tube has a value between 0.3 and 0.5.

14. The LED tube lamp of claim 1, wherein the power supply module is packaged by a heat shrink sleeve.

15. The LED tube lamp of claim 1, wherein the power supply module further comprises:
a rectifying circuit, coupled to the electrically conductive pins of the two end caps for rectifying the external driving signal to generate a rectified signal; and
a filtering circuit, coupled to the rectifying circuit for filtering the rectified signal to generate a filtered signal.

16. The LED tube lamp of claim 15, wherein the power supply module further comprises an anti-flickering circuit, coupled to the filtering circuit, configured such that a current higher than a particular anti-flickering current flows through the anti-flickering circuit when a peak value of the filtered signal is higher than a minimum conduction voltage of the LED module.

17. The LED tube lamp of claim 16, wherein the anti-flickering circuit comprises at least one resistor.

18. The LED tube lamp of claim 15, wherein the rectifying circuit is a full-wave rectifying circuit.

19. The LED tube lamp of claim 1, wherein the power supply module further comprises an over voltage protection circuit, coupled to a first filtering output terminal and a second output terminal of the filtering circuit to detect the filtered signal for clamping a voltage level of the filtered signal when the voltage level of the filtered signal is higher than a particular over voltage value.

20. The LED tube lamp of claim 19, wherein the over voltage protection circuit comprises a voltage clamping diode.

21. The LED tube lamp of claim 1, wherein the actuator includes a shaft extending axially at a lower portion of the actuator and movably connected to a base mounted inside the main body.

22. The LED tube lamp of claim 21, further comprising a coil spring surrounding the shaft between the flange and the base, wherein the coil spring and the flange are configured to move the actuator to its rest position when the electrically conductive pin is not connected to receive the external driving signal.

23. The LED tube lamp of claim 1, further comprising a coil spring, wherein the actuator includes a spring retainer and a bulging part protruding from a bottom of the spring retainer, and wherein the coil spring is provided between the spring retainer and a base mounted inside the main body.

24. The LED tube lamp of claim 23, wherein the micro switch is configured to be actuated by the bulging part at a predetermined actuation point and when the electrically conductive pin receives the external driving signal, the actuator is configured to bring the bulging part to the predetermined actuation point and the micro switch is configured to complete the circuit between the electrically conductive pin and the power supply module.

25. The LED tube lamp of claim 1, further comprising:
a first coil spring provided between a spring retainer included in the actuator and a first end of the micro switch;
a second coil spring provided between a second end of the micro switch and a base mounted inside the main body, wherein the first coil spring has a first stiffness and the second coil spring has a second stiffness different from the first stiffness.

26. The LED tube lamp of claim 25, wherein, the micro switch is configured to be triggered when the first coil spring is compressed to a predetermined actuation point, and the micro switch when triggered completes the circuit between the electrically conductive pin and the power supply module.

27. The LED tube lamp of claim 25, wherein the first coil spring, the second coil spring, and the flange are configured to move the actuator to its rest position when the conductive pin is not connected to receive the external driving signal.

28. An LED tube lamp, comprising:
a glass tube;
two end caps disposed at two ends of the glass tube, at least one of the end caps having a main body, an actuator configured to move toward and extend away from the glass tube, a first contact element, a second contact element, and an electrically conductive pin, wherein the actuator includes a flange extending radially at an intermediary portion of the actuator and wherein the first contact element and the second contact element are configured to be triggered by the actuator being pressed when the electrically conductive pin receives an external driving signal;
a power supply module, disposed in at least one end cap and coupled to the electrically conductive pins of the two end caps; and
an LED light strip disposed inside the glass tube with at least one LED light source that is mounted on the LED light strip and electrically connected with the power supply module through the LED light strip;
wherein, the glass tube includes a diffusion film to allow the light emitted from the least one light source of the LED tube lamp to pass through the diffusion film and the glass tube surface in sequence; and the first contact element is configured to engage the second contact element to complete a circuit between the electrically conductive pin and the power supply module when the first contact element and the second contact element are triggered by the actuator.

29. The LED tube lamp of claim 28, wherein, the actuator includes a shaft extending axially at a lower portion of the actuator and the first contact element and the second contact element face each other through the shaft.

30. The LED tube lamp of claim 29, wherein the first contact element is configured to impart a spring-like bias on the shaft and to push the shaft against the second contact element.

* * * * *